United States Patent
Niu et al.

(10) Patent No.: US 12,474,553 B2
(45) Date of Patent: Nov. 18, 2025

(54) ZOOM LENS, CAMERA MODULE, AND MOBILE TERMINAL

(71) Applicant: Huawei Technologies Co., Ltd., Shenzhen (CN)

(72) Inventors: Yajun Niu, Shanghai (CN); Xiuwen Yao, Wuhan (CN); Haishui Ye, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 377 days.

(21) Appl. No.: 17/908,140

(22) PCT Filed: Mar. 12, 2021

(86) PCT No.: PCT/CN2021/080606
§ 371 (c)(1),
(2) Date: Aug. 30, 2022

(87) PCT Pub. No.: WO2021/185185
PCT Pub. Date: Sep. 23, 2021

(65) Prior Publication Data
US 2023/0359004 A1    Nov. 9, 2023

(30) Foreign Application Priority Data

Mar. 16, 2020 (CN) .......................... 202010183194.9

(51) Int. Cl.
*G02B 15/14* (2006.01)
*G02B 15/28* (2006.01)
(Continued)

(52) U.S. Cl.
CPC ...... *G02B 15/144113* (2019.08); *G02B 15/28* (2013.01); *G03B 5/00* (2013.01);
(Continued)

(58) Field of Classification Search
CPC ............ G02B 15/144133; G02B 15/28; G03B 17/17; G03B 5/00; G03B 2205/0046; H04N 23/55
(Continued)

(56) References Cited

U.S. PATENT DOCUMENTS 7,365,911 B2 * 4/2008 Yamashita ......... G02B 15/1461
359/683
7,773,310 B2 * 8/2010 Matsunaga .... G02B 15/145113
359/740
(Continued)

FOREIGN PATENT DOCUMENTS

CN    101191896 A    6/2008
CN    202372693 U    8/2012
(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007).*

*Primary Examiner* — Pinping Sun
*Assistant Examiner* — Andrew R Wright
(74) *Attorney, Agent, or Firm* — Slater Matsil, LLP

(57) ABSTRACT

Embodiments of this application disclose a zoom lens, a camera module, and a mobile terminal. The zoom lens includes a first lens group, a second lens group, a third lens group, and a fourth lens group that are arranged along an object side to an image side. The first lens group is a fixed lens group with positive focal power, the second lens group is a zoom lens group with negative focal power, the third lens group is a compensative lens group with positive focal power, and the fourth lens group is a fixed lens group with positive focal power. In a zooming process of the zoom lens from a short-focal end to a long-focal end, the second lens
(Continued)

group moves towards the image side along an optical axis, and the third lens group moves towards the object side along the optical axis.

18 Claims, 23 Drawing Sheets

(51) Int. Cl.
    *G03B 5/00*     (2021.01)
    *G03B 17/17*     (2021.01)
    *H04N 23/55*     (2023.01)

(52) U.S. Cl.
    CPC .............. *G03B 17/17* (2013.01); *H04N 23/55* (2023.01); *G03B 2205/0046* (2013.01)

(58) Field of Classification Search
    USPC ......................................................... 359/687
    See application file for complete search history.

(56) References Cited

U.S. PATENT DOCUMENTS

| | | | |
|---|---|---|---|
| 9,696,525 B2* | 7/2017 | Yamasaki | G02B 15/145129 |
| 11,099,366 B2* | 8/2021 | Masugi | G02B 15/145121 |
| 2004/0051960 A1 | 3/2004 | Mihara | |
| 2004/0105020 A1 | 6/2004 | Iwasawa | |
| 2007/0064313 A1* | 3/2007 | Hosokawa | G02B 13/006 |
| | | | 359/680 |
| 2009/0147375 A1* | 6/2009 | Sudoh | G02B 15/1461 |
| | | | 359/683 |
| 2011/0050987 A1* | 3/2011 | Nishikawa | H04N 23/55 |
| | | | 348/374 |
| 2013/0141797 A1 | 6/2013 | Hagiwara | |
| 2013/0271630 A1* | 10/2013 | Nakamura | G02B 15/14 |
| | | | 359/687 |
| 2015/0309292 A1* | 10/2015 | Aoi | G02B 15/173 |
| | | | 359/687 |
| 2019/0377166 A1* | 12/2019 | Komatsu | G03B 3/10 |
| 2021/0113063 A1* | 4/2021 | Obikane | G02B 15/145113 |
| 2021/0141198 A1* | 5/2021 | Asami | G02B 13/14 |

FOREIGN PATENT DOCUMENTS

| | | | | |
|---|---|---|---|---|
| CN | 103033913 A | 4/2013 | | |
| CN | 205263388 U | 5/2016 | | |
| CN | 106054364 A | 10/2016 | | |
| CN | 107193117 A | 9/2017 | | |
| CN | 107229113 A | 10/2017 | | |
| CN | 206773283 U | 12/2017 | | |
| CN | 109597190 A | 4/2019 | | |
| IN | 109143555 A | 1/2019 | | |
| JP | 2007219040 A | * 8/2007 | ........... G02B 15/173 |
| JP | 2014126765 A | 7/2014 | | |
| TW | 201217830 A | 5/2012 | | |

\* cited by examiner

ZOOM LENS, CAMERA MODULE, AND MOBILE TERMINAL

CROSS-REFERENCE TO RELATED APPLICATIONS

The present application is a National Stage of International Patent Application No. PCT/CN2021/080606, filed on Mar. 12, 2021, which claims priority to Chinese Patent Application No. 202010183194.9, filed on Mar. 16, 2020. Both of the aforementioned applications are hereby incorporated by reference in their entireties.

TECHNICAL FIELD

Embodiments of this application relate to the field of terminal technologies, and in particular, to a zoom lens, a camera module, and a mobile terminal.

BACKGROUND

In recent years, with development of science and technologies, consumers have increasingly high requirements on photographing performance of mobile phones, for example, a wider zoom range, higher resolution, and higher imaging quality. These impose higher requirements on lenses of the mobile phones, and single-focal-length lenses and digital zooming can no longer meet the requirements of consumers.

Currently, high-power optical zoom of lenses of mobile phones launched in the market is basically "jumping" zoom. To be specific, two or three lenses with different focal lengths are installed, and algorithm-based digital zoom is used for hybrid optical zoom. However, the jumping digital zoom is implemented based on a plurality of lenses with different focal lengths, and implements continuous zoom through algorithm processing, which is not actually continuous zoom. Jumping digital zoom has a disadvantage that in a zoom process, a discontinuous part beyond focal length ranges of the plurality of lenses has lower imaging definition than that of continuous optical zoom, affecting imaging quality.

SUMMARY

This application provide a zoom lens, a camera module, and a mobile terminal. The zoom lens can implement continuous zooming, to improve imaging quality.

According to a first aspect, this application provides a zoom lens. The zoom lens includes: a first lens group, a second lens group, a third lens group, and a fourth lens group that are arranged along an object side to an image side.

The first lens group is a fixed lens group with positive focal power. The first lens group is capable of converging rays to compress beam apertures of the second lens group and the third lens group. A position of the first lens group in the zoom lens is fixed.

The second lens group is a zoom lens group with negative focal power. The third lens group is a compensative lens group with positive focal power. The second lens group and the third lens group are mutually focusing lens groups. Both the second lens group and the third lens group can move along an optical axis of the zoom lens (briefly referred to as an optical axis below). The second lens group is a zoom lens group, and is configured to change a focal length of an optical system. The third lens group is a compensative lens group, and is configured to compensate a position of an image plane, so that a focus of the zoom lens falls on the image plane of the image sensor. In other words, the third lens group can compensate for a focus adjustment range of the second lens group.

The fourth lens group is a fixed lens group with positive focal power. The fourth lens group is configured to compress a beam angle during zooming, so that a chief ray angle of the zoom lens matches a chief ray angle of the image sensor. The fourth lens group may be further configured to perform field curvature correction, to correct an aberration. A position of the fourth lens group in the zoom lens is fixed.

In a zooming process of the zoom lens from a short-focal end to a long-focal end, the second lens group moves towards the image side along an optical axis, and the third lens group moves towards the object side along the optical axis.

In this application, the zoom lens is provided with the movable second lens group and the movable third lens group, and the zoom lens can perform continuous zooming by moving the second lens group and the third lens group, to achieve better imaging quality.

Because movement directions of the second lens group and the third lens group are opposite during zooming, a stroke of a motor for driving the second lens group to move and a stroke of a motor for driving the third lens group to move can be shortened. This reduces difficulties in designing the motors, improves precision for controlling the motors, and further improves imaging quality of the zoom lens.

In a possible implementation, the zoom lens further includes a lens support base, and a first lens barrel, a first motor, a second motor, and a second lens barrel that are fastened on an inner side of the lens support base. The first lens group is fastened to the inner side of the first lens barrel. The second lens group is mounted on the first motor, and the first motor is configured to drive the second lens group to move along the optical axis. The third lens group is mounted on the second motor, and the second motor is configured to drive the third lens group to move along the optical axis. The fourth lens group is fastened to the inner side of the second lens barrel.

In a possible implementation, a total quantity N of lenses in the first lens group, the second lens group, the third lens group, and the fourth lens group meets: $6 \leq N \leq 12$.

In this implementation, a total quantity of lenses in the zoom lens is greater than or equal to 6, so that a basic optical requirement of the four lens groups can be met, to ensure imaging quality of the zoom lens. In addition, the total quantity of lenses in the zoom lens is less than or equal to 12, and a total track length TTL of the zoom lens can be restricted. This facilitates miniaturization of the zoom lens.

In a possible implementation, the first lens group includes at least one lens with positive focal power and at least one lens with negative focal power. A lens that is in the first lens group and that is closest to the object side has positive focal power. The second lens group includes at least two lenses. A lens that is in the second lens group and that is closest to the object side has negative focal power. The third lens group includes at least two lenses. A lens that is in the third lens group and that is closest to the object side has positive focal power. The fourth lens group includes at least one lens. A lens that is in the fourth lens group and that is closest to the object side has positive focal power.

In a possible implementation, a lens that is in the third lens group and that is closest to the image side has negative focal power. In this case, the lens that is closest to the image side and that is with negative focal power can diffuse rays, so that imaging of the zoom lens meets a requirement for an image height, and a requirement for a small aperture size of the third lens group can also be met.

In a possible implementation, the first lens group, the second lens group, and the third lens group include at least one lens made of glass.

In this implementation, because the first lens group, the second lens group, and the third lens group include at least one lens made of glass, temperature drift of the zoom lens from −25° C. to 60° C. can be controlled within 30 μm, to improve focusing experience.

In a possible implementation, a ratio of the total track length TTL of the zoom lens, from a surface closest to the object side to the image plane, to a focal length f1 of the first lens group meets: $0.7 \leq TTL/f1 \leq 3.2$. A ratio of the total track length TTL of the zoom lens, from the surface closest to the object side to the image plane, to a focal length f2 of the second lens group meets: $-7 \leq TTL/f2 \leq -3$. A ratio of the total track length TTL of the zoom lens, from the surface closest to the object side to the image plane, to a focal length f3 of the third lens group meets: $1.7 \leq TTL/f3 \leq 4.5$. A ratio of the total track length TTL of the zoom lens, from the surface closest to the object side to the image plane, to a focal length f4 of the fourth lens group meets: $1 \leq TTL/f4 \leq 2.8$.

In this implementation, the zoom lens controls the ratio of the total track length TTL to each of the focal lengths of the four lens groups to be within a specified range, so that better imaging quality is achieved in a continuous zoom process.

In a possible implementation, a ratio of a stroke L1 of the second lens group along the optical axis to the total track length TTL of the zoom lens from the surface closest to the object side to the image plane meets: $|L1/TTL| \leq 0.3$.

In this implementation, because the ratio of the stroke L1 of the second lens group to the total track length TTL of the zoom lens is less than or equal to 0.3, the stroke L1 of the second lens group can be controlled within a relatively small range, and a requirement for a stroke of a motor (the first motor) that drives the second lens group to move is low. This reduces difficulties in designing the motor, improves precision for controlling the motor, and further improves imaging quality of the zoom lens.

In a possible implementation, a ratio of a stroke L2 of the third lens group along the optical axis to the total track length TTL of the zoom lens from the surface closest to the object side to the image plane meets: $|L2/TTL| \leq 0.3$.

In this implementation, because the ratio of the stroke L2 of the third lens group to the total track length TTL of the zoom lens is less than or equal to 0.3, the stroke L2 of the third lens group can be controlled within a relatively small range, and a requirement for a stroke of a motor (the second motor) that drives the third lens group to move is low. This reduces difficulties in designing the motor, improves precision for controlling the motor, and further improves imaging quality of the zoom lens.

In a possible implementation, a ratio of the total track length TTL of the zoom lens from the surface closest to the object side to the image plane, to a focal length Fmax at the long-focal end meets: $|TTL/Fmax| \leq 2.0$.

In this implementation, the zoom lens can implement a relatively long focal length using a relatively short total track length TTL, to effectively reduce a size of the zoom lens while ensuring telephoto shooting, so that the zoom lens is easier to install and has wider applicability.

In a possible implementation, a ratio of the focal length Fmax at the long-focal end of the zoom lens to a focal length Fmin at the short-focal end of the zoom lens meets: $Fmax/Fmin \leq 5.0$.

In this implementation, the ratio of the focal length Fmax at the long-focal end to the focal length Fmin at the short-focal end is controlled. This well achieves trade-off between design difficulties and a requirement for zoom performance of the zoom lens, so that the zoom lens achieves trade-off between performance and costs and is more competitive.

In a possible implementation, each lens in the zoom lens is provided with a notch for reducing a height of the lens.

Because each lens in the zoom lens is provided with the notch for reducing the height of the lens, a size in a height direction of the optical system can be effectively reduced, so that the zoom lens has a relatively small height size, and is better applicable to a miniaturized mobile terminal. This increases applicability of the zoom lens. In addition, because the height of the lens is reduced through notching, a relatively large aperture may be set for the lens, to increase an amount of light admitted by the optical system, and imaging quality of the zoom lens is better.

In a possible implementation, a ratio of an effective height h of each lens in the zoom lens to a maximum aperture diameter d meets: $h/d \geq 0.45$.

In this implementation, the zoom lens controls the ratio of the effective height h of the lens to the maximum aperture diameter d to be greater than or equal to 0.45, so that an optical image of the zoom lens can have a better surface shape and the zoom lens can have better imaging resolution while the height of the lens is reduced for miniaturization.

In a possible implementation, the effective height h of each lens in the zoom lens meets $h \leq 6.5$ mm. In this implementation, the zoom lens restricts a height H of each lens in the zoom lens by restricting the effective height h of each lens, so that a size of the zoom lens can better match a miniaturized mobile terminal.

In a possible implementation, the maximum aperture diameter d of each lens in the zoom lens meets: $d \leq 10$ mm. In this implementation, the zoom lens restricts a maximum diameter D of each lens in the zoom lens by restricting the maximum aperture diameter d of each lens, so that the size of the zoom lens can better match the miniaturized mobile terminal.

In a possible implementation, the maximum aperture diameter d of each lens in the zoom lens meets: $d \leq 6.5$ mm. In this case, a module size of the zoom lens is relatively small, and can be well applicable to the miniaturized mobile terminal.

In a possible implementation, the third lens group includes an aperture stop, and the third lens group includes a 1st lens and a 2nd lens that are arranged from the object side to the image side. The aperture stop is located on an object side of the 1st lens in the third lens group, or located between the 1st lens and the 2nd lens in the third lens group.

In this implementation, the aperture stop is disposed in the third lens group, so that the aperture stop can better constrain rays in the optical system, to improve imaging quality of the zoom lens. In some other implementations, the aperture stop may alternatively be located between the 1st lens and the 2nd lens in the third lens group.

In a possible implementation, a working F-number of the zoom lens meets: $2.0 \leq$ working F-number $\leq 6.5$.

In this implementation, the working F-number is an equivalent aperture F-number of the zoom lens whose lens is notched. When the working F-number meets the foregoing requirement, imaging of the zoom lens can achieve better resolution and better imaging quality.

According to a second aspect, this application further provides a camera module, including an image sensor and the zoom lens described in any one of the foregoing implementations, where rays can pass through the zoom lens and illuminate the image sensor. The camera module uses the foregoing zoom lens, to achieve better imaging quality.

In a possible implementation, the camera module further includes a prism or a mirror. The prism or the mirror is located on an object side of the zoom lens, and is configured to deflect rays to the zoom lens.

In this implementation, the camera module changes a direction of rays by disposing the prism or the mirror, so that a direction of an optical axis of the zoom lens may be different from a direction in which external rays enter a mobile terminal. In this way, a placement position, an angle, space, or the like of the camera module is more flexible, and the zoom lens can be used in a periscope camera module. For example, the direction of the optical axis of the zoom lens may be parallel to a display screen.

According to a third aspect, this application further provides a mobile terminal, including an image processor and the camera module described in any one of the foregoing implementations. The image processor and the camera module are in a communication connection, and the image processor is configured to obtain image data from the camera module and process the image data. The camera module of the mobile terminal has better imaging quality, and user experience of photographing is better.

DETAILED DESCRIPTION OF ILLUSTRATIVE EMBODIMENTS

Figure 1:
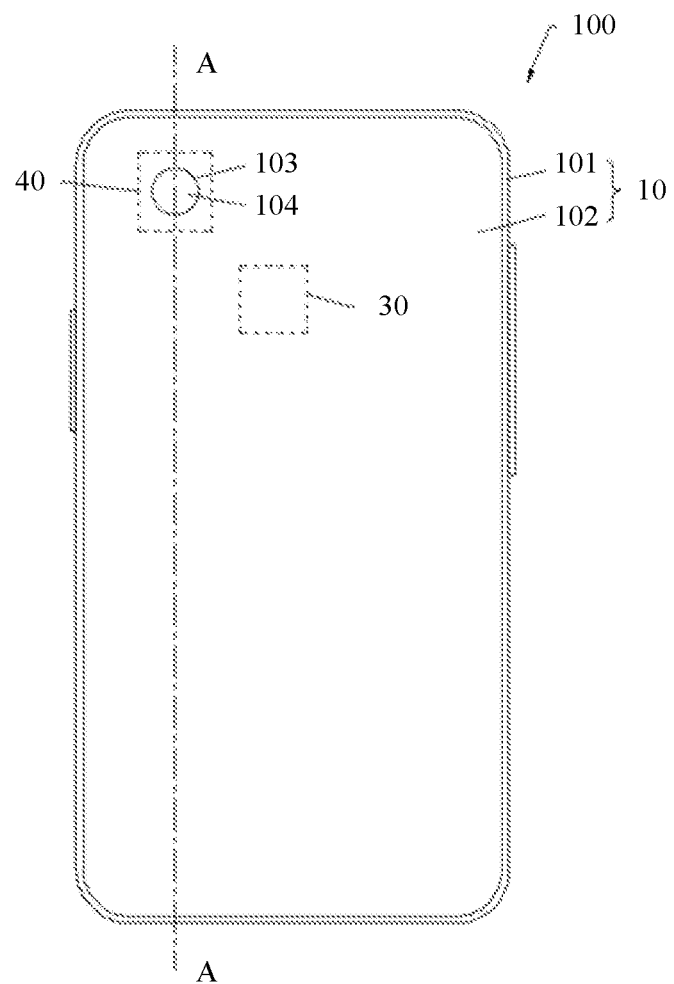
FIG. 1 is a schematic diagram of a structure of a mobile terminal in some embodiments according to an embodiment of this application.

The following describes embodiments of this application with reference to the accompanying drawings in embodiments of this application.

For ease of understanding, the following first explains and describes English abbreviations and related technical terms used in embodiments of this application.

Focal power equals to a difference between an image-side beam convergence degree and an object-side beam convergence degree, and represents an ability of deflecting rays of an optical system.

A lens or a lens group with positive focal power has an effect of converging rays.

A lens or a lens group with negative focal power has an effect of diverging rays.

Focal length (focal length) is a measurement of how strongly the optical system converges or diverges rays. It refers to, when a clear image of an infinite scene is formed on a focal plane by using a lens or a lens group, a vertical distance from an optical center of the lens or the lens group to the focal plane. From a practical perspective, the focal length may be understood as a distance from a center of the lens to the plane. A position of an optical center of a fixed-focus lens is fixed, while a focal length of a zoom lens varies with an optical center of the zoom lens.

Using a lens or a lens group as a boundary, one side on which a photographed object is located is an object side, and one side on which an image of the photographed object is located is an image side. A surface of the lens near the object side is referred to as an object-side surface, and a surface of the lens near the image side is referred to as an image-side surface.

Aperture (Aperture), also referred to as a diaphragm (diaphragm), is a device configured to control an amount of light reaching a photosensitive surface of a camera by passing through a lens. The aperture is usually inside the lens.

F-number (F-number, also referred to as an F-value) is a relative value (a reciprocal of a relative aperture) obtained by dividing a focal length of the lens by an aperture diameter of the lens. A smaller F-number indicates more light admitted per unit time. A larger F-number indicates a smaller depth of field, so that photographed background content is blurred. This is similar to an effect achieved by a telephoto lens.

Working F-number (working F-number, also referred to a working F-value) is a relative value (the reciprocal of the relative aperture) obtained by dividing the focal length of a lens in a working state by the aperture diameter of the lens. It is applicable to optical systems where light is blocked off. A smaller working F-number indicates more light admitted per unit time. A larger working F-number indicates a smaller depth of field, so that photographed background content is blurred. This is similar to an effect achieved by a telephoto lens.

Total track length (total track length, TTL) is a total length from a surface closest to the object side of the lens to the image plane. The TTL is a main factor that forms a camera length.

Imaging plane is a carrier plane that is located on the image side of all lenses in the zoom lens and at which an image is formed for which rays successively pass through the lenses in the zoom lens.

Optical axis is a line along which rays pass perpendicularly through a center of a lens. Optical axis of a lens is a line that passes through the center of the lens. When rays parallel to the optical axis enter a convex lens, an ideal convex lens converges all the rays at one point behind the lens. This point at which all the rays converge is a focal point.

Abbe number, also referred to as a dispersion coefficient, is a refractive index difference ratio of an optical material at different wavelengths, and indicates a dispersion degree of the material.

Spherical aberration (spherical aberration), also referred to as a spherical aberration, is a position difference between an actual image point and an ideal image point.

Axial spherical aberration is a difference between a position of an actual image point and a position of an ideal image point in a direction parallel to an optical axis.

Distortion (distortion), also referred to as distortion, is a degree at which an image formed by the optical system for an object is distorted relative to the object. Distortion is caused when a height between points at which chief rays with different fields of view passing through the optical system intersect a Gaussian image plane is not equal to an ideal image height due to a spherical aberration of a diaphragm, and a difference between the two heights is distortion. Therefore, distortion changes only an imaging position of an off-axis object point on an ideal plane, to make a shape of an image distorted, but does not affect definition of the image.

Embodiments of this application provide a zoom lens, a camera module in which the zoom lens is used, and a mobile terminal that includes the camera module. The zoom lens includes four lens groups sequentially arranged along an object side to an image side, and the two lens groups in the middle can move along an optical axis, so that the zoom lens implements continuous zooming to obtain better imaging quality. In addition, in a zooming process of the zoom lens from a short-focal end to a long-focal end, the two lens groups located in the middle move towards each other to implement zooming. Because movement directions of the two lens groups are opposite, strokes of motor can be shortened. This reduces difficulties in designing the motors, improves precision for controlling the motors, and further improves imaging quality of the zoom lens. The mobile terminal may be a device that has a photographing or video shooting function, such as a mobile phone, a tablet computer, or a laptop.

Figure 2:
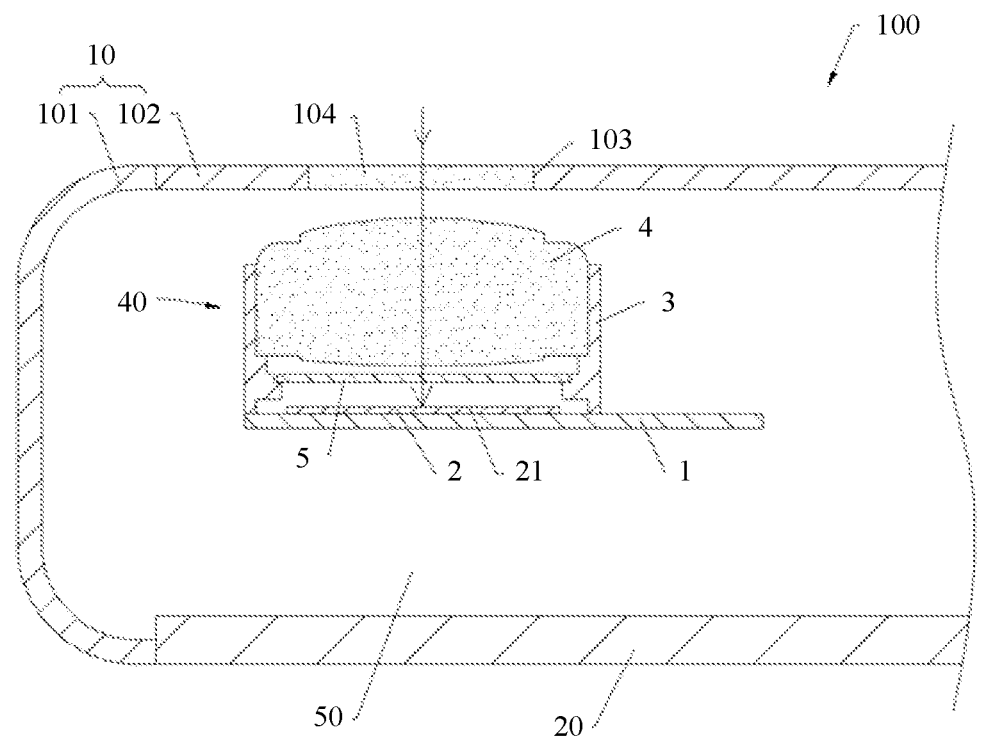
FIG. 2 is a schematic A-A sectional view of the structure of the terminal shown in FIG. 1.

Refer to FIG. 1 and FIG. 2. FIG. 1 is a schematic diagram of a structure of a mobile terminal 100 according to an embodiment of this application in some embodiments. FIG. 2 is a schematic A-A sectional view of the structure of the mobile terminal 100 shown in FIG. 1. In embodiments, an example in which the mobile terminal 100 is a mobile phone is used for description.

The mobile terminal 100 includes a housing 10, a display screen 20, an image processor 30, and a camera module 40. In some embodiments, the housing 10 includes a frame 101 and a rear cover 102. The frame 101 and the rear cover 102 may be an integrated structure, or may be assembled to form an integrated structure. The display screen 20 and the rear cover 102 are respectively mounted on two sides of the frame 101, and jointly enclose an inner cavity 50 of the entire device.

The image processor 30 and the camera module 40 are accommodated in the inner cavity 50 of the entire device. The image processor 30 and the camera module 40 are in a communication connection, and the image processor 30 is configured to obtain image data from the camera module 40 and process the image data. The communication connection between the camera module 40 and the image processor 30 may be implemented in an electrical connection manner such as cabling or in a coupling manner or the like, for data transmission. It can be understood that the communication connection between the camera module 40 and the image processor 30 may alternatively be implemented in another manner for data transmission.

The image processor 30 is configured to perform optimization processing on a digital image signal using a series of complex mathematical algorithm operations, and finally transmit a processed signal to a display. The image processor 30 may be an image processing chip or a digital signal processing chip. The image processor 30 is configured to quickly and timely transfer data obtained by a photosensitive chip to a central processing unit and refresh the photosensitive chip. Therefore, quality of the image processor 30 directly affects picture quality (for example, color saturation and definition).

In this embodiment, the rear cover 102 is provided with a camera hole 103, the camera module 40 collects rays through the camera hole 103, and the camera module 40 is used as a rear-facing camera of the mobile terminal 100. For example, the rear cover 102 includes a transparent lens 104, and the transparent lens 104 is mounted on the camera hole 103, to allow rays to pass through and prevent dust and water. In some other embodiments, the camera module 40 may alternatively be used as a front-facing camera of the mobile terminal 100.

It can be understood that a position at which the camera module 40 is installed in the mobile terminal 100 in the embodiment shown in FIG. 1 is merely an example, and the installation position of the camera module 40 is not strictly limited in this application. In some other embodiments, the camera module 40 may alternatively be installed at another position of the mobile terminal 100. For example, the camera module 40 may be installed in the upper middle or at an upper right corner of the back of the mobile terminal 100. In some other embodiments, the mobile terminal 100 may include a terminal body and an auxiliary component that can rotate, move, or detach relative to the terminal body. The camera module 40 may alternatively be disposed on the auxiliary component.

In some embodiments, the mobile terminal 100 may further include an analog-to-digital converter (also referred to as an A/D converter, which is not shown in the figure).

The analog-to-digital converter is connected between the camera module 40 and the image processor 30. The analog-to-digital converter is configured to convert a signal generated by the camera module 40 into a digital image signal, and transmit the digital image signal to the image processor 30, then the image processor 30 processes the digital image signal, and finally the display screen 20 displays an image or a video.

In some embodiments, the mobile terminal 100 may further include a memory (not shown in the figure). The memory and the image processor 30 are in a communication connection. After processing an image digital signal, the image processor 30 transmits the image to the memory, so that the image can be found in the memory at any time and displayed on the display screen 20 when the image needs to be viewed subsequently. In some embodiments, the image processor 30 further compresses a processed image digital signal, and then stores the compressed image digital signal in the memory to save memory space.

As shown in FIG. 2, in some embodiments, the camera module 40 includes a circuit board 1, an image sensor 2, a holder (holder) 3, a zoom lens 4, and an optical filter 5. The holder 3 is fastened on the circuit board 1, and the image sensor 2 is fastened on the circuit board 1 and is located on an inner side of the holder 3. The zoom lens 4 is mounted on the holder 3, and is located on a side that is of the image sensor 2 and that is opposite to the circuit board 1. The image sensor 2 is located on an image side of the zoom lens 4. The optical filter 5 is mounted on the holder 3, and is located between the zoom lens 4 and the image sensor 2. Light can pass through the zoom lens 4 and illuminate an image plane 21 of the image sensor 2. For example, an operating principle of the camera module 40 is as follows: The zoom lens 4 generates an optical image based on rays reflected by a photographed object, and project the optical image to the image plane 21 of the image sensor 2; the image sensor 2 converts the optical image into an electrical signal, that is, an analog image signal, and transmits the electrical signal to the analog-to-digital converter; and the analog-to-digital converter converts the electrical signal into a digital image signal, and sends the digital image signal to the image processor 30.

The image sensor 2 (also referred to as a photosensitive component) is a semiconductor chip. There are hundreds of thousands to millions of photodiodes on a surface of the image sensor 2, and electric charges are generated when the photodiodes are irradiated by rays. The image sensor 2 may be a charge-coupled device (charge coupled device, CCD), or may be a complementary metal-oxide semiconductor (complementary metal-oxide semiconductor, CMOS). A charge coupled device is made of a highly sensitive semiconductor material, and can convert rays into electric charges. The charge coupled device is constituted by many photosensitive units, usually in megapixels. When the surface of a charge coupled device is illuminated by rays, each photosensitive unit reflects the electric charge on the device. The signals generated by all photosensitive units are combined to form a complete picture. The complementary metal-oxide conductor device is a semiconductor mainly made by using two elements: silicon and germanium, so that semiconductors of N (with negative electrons) and P (with positive electrons) levels coexist on the complementary metal-oxide conductor device. Current generated by these two complementary effects can be recorded and interpreted into images by a processing chip.

The zoom lens 4 affects imaging quality and effect, and performs imaging mainly through refraction of the lens. To be specific, rays from an object pass through the zoom lens 4 to form a clear image on a focal plane, and the image sensor 2 located on the focal plane records the image of the object.

The optical filter 5 is configured to filter out unnecessary rays projected onto the image sensor 2, and prevent the image sensor 2 from generating false colors or ripples, so as to improve effective resolution and color reproduction of the image sensor 2. For example, the optical filter 5 may be an infrared optical filter 5.

Figure 3:
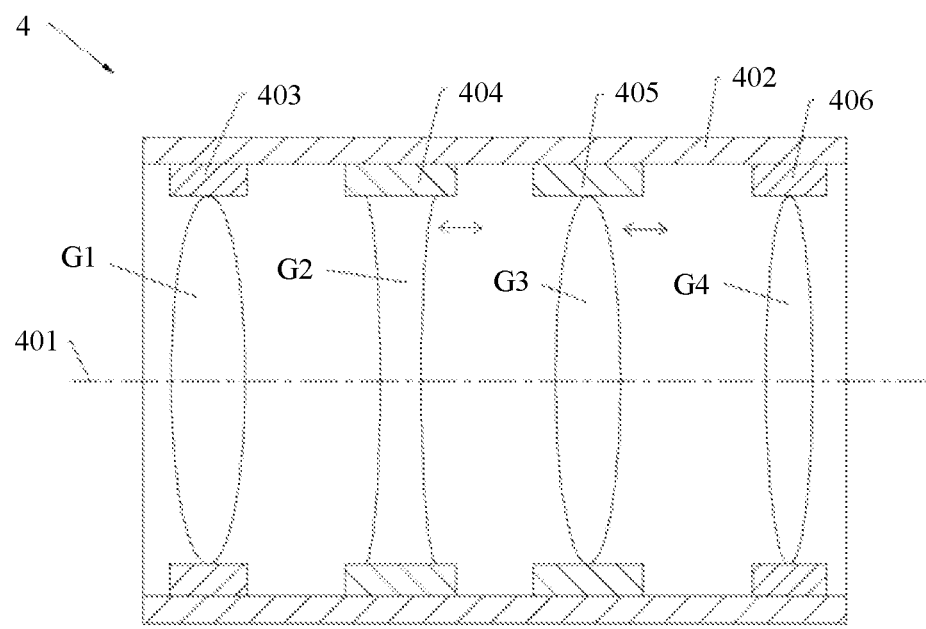
FIG. 3 is a schematic diagram of a structure of a zoom lens in the camera module shown in FIG. 2.

Refer to FIG. 3. FIG. 3 is a schematic diagram of a structure of the zoom lens 4 of the camera module 40 shown in FIG. 2. FIG. 3 is a schematic diagram in which all lenses in the lens groups in the zoom lens 4 are simplified into one lens. The structure in FIG. 3 does not constitute any limitation on a quantity or shapes of lenses in the lens group.

In some embodiments, the zoom lens 4 includes: a first lens group G1, a second lens group G2, a third lens group G3, and a fourth lens group G4 that are arranged along an object side to an image side. The first lens group G1 is a fixed lens group with positive focal power. The first lens group G1 is capable of converging rays to compress beam apertures of the second lens group G2 and the third lens group G3. A position of the first lens group G1 in the zoom lens 4 is fixed. The second lens group G2 is a zoom lens group with negative focal power, and the third lens group G3 is a compensative lens group with positive focal power. The second lens group G2 and the third lens group G3 are mutually focusing lens groups. Both the second lens group G2 and the third lens group G3 can move along an optical axis 401 of the zoom lens 4 (briefly referred to as the optical axis 401). The second lens group G2 is a zoom lens group, and is configured to change a focal length of an optical system. The third lens group G3 is a compensative lens group, and is configured to make compensation for a position of an image plane, so that a focal point of the zoom lens 4 falls on the image plane 21 of the image sensor 2. In other words, the third lens group G3 can compensate for a range for focus adjustment of the second lens group G2. The fourth lens group G4 is a fixed lens group with positive focal power. The fourth lens group G4 is configured to compress a beam angle during zooming, so that a chief ray angle (chief ray angle, CRA) of the zoom lens 4 matches a chief ray angle of the image sensor 2. The fourth lens group G4 may be further configured to perform field curvature correction, to correct an aberration. A position of the fourth lens group G4 in the zoom lens 4 is fixed.

In this embodiment, the zoom lens 4 is provided with the movable second lens group G2 and the movable third lens group G3, and the zoom lens 4 can perform continuous zooming by moving the second lens group G2 and the third lens group G3, to achieve better imaging quality.

In some embodiments, the zoom lens 4 further includes a lens support base 402, and a first lens barrel 403, a first motor 404, a second motor 405, and a second lens barrel 406 that are fastened on an inner side of the lens support base 402. The first lens group G1 is fastened to the inner side of the first lens barrel 403. The second lens group G2 is mounted on the first motor 404, and the first motor 404 is configured to drive the second lens group G2 to move along the optical axis 401. The third lens group G3 is mounted on the second motor 405, and the second motor 405 is configured to drive the third lens group G3 to move along the optical axis 401. The fourth lens group G4 is fastened to the inner side of the second lens barrel 406. It can be understood that the first motor 404 and the second motor 405 may be of a same type or of different types. There may alternatively be another design solution for a structure for mounting a plurality of lens groups in the zoom lens 4. This is not strictly limited in this application.

Figure 4:
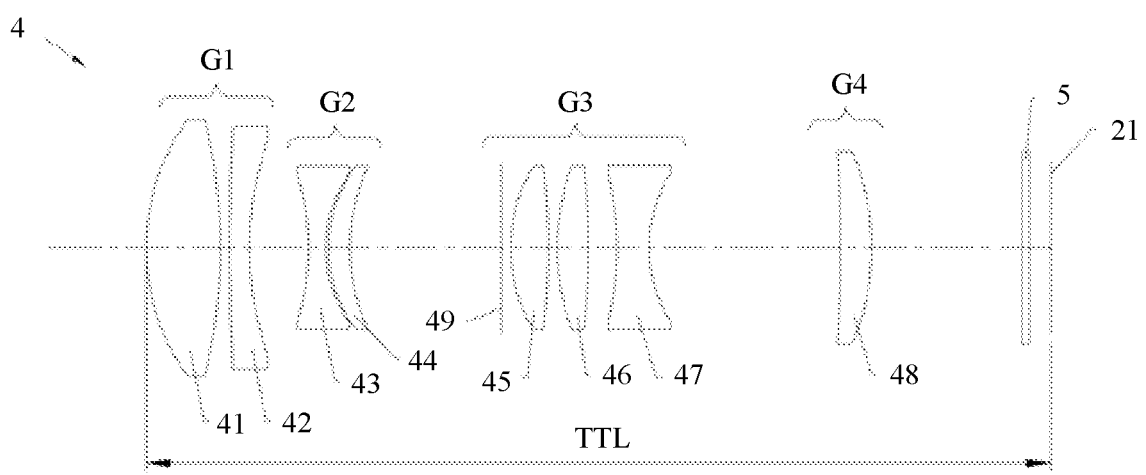
FIG. 4 is a schematic diagram of a partial structure of the zoom lens shown in FIG. 3 in some embodiments.

FIG. 4 is a schematic diagram of a partial structure of the zoom lens 4 shown in FIG. 3 in some embodiments. FIG. 4 mainly shows structures of a plurality of lens groups in the zoom lens 4. For ease of description, the optical filter 5 and the image plane 21 of the camera module 40 are also shown.

In some embodiments, a total quantity N of lenses in the first lens group G1, the second lens group G2, the third lens group G3, and the fourth lens group G4 meets $6 \leq N \leq 12$. For example, as shown in FIG. 4, a total quantity of lenses in the four lens groups in the zoom lens 4 is 8. In some other embodiments, a total quantity N of lenses in the four lens groups in the zoom lens 4 may also be 6, 7, 9, 10, 11, or 12. It can be understood that, in this embodiment of this application, all lenses in the zoom lens 4 are lenses with positive focal power or negative focal power. When a plane mirror is inserted between a plurality of lenses, the plane mirror is not considered as a lens in the zoom lens 4.

In this implementation, a total quantity of lenses in the zoom lens 4 is greater than or equal to 6, so that a basic optical requirement of the four lens groups can be met, to ensure imaging quality of the zoom lens 4. In addition, the total quantity of lenses in the zoom lens 4 is less than or equal to 12, and a total track length TTL of the zoom lens 4 can be restricted. This facilitates miniaturization of the zoom lens 4.

In some embodiments, the first lens group G1 includes at least one lens with positive focal power and at least one lens with negative focal power. A lens that is in the first lens group G1 and that is closest to the object side has positive focal power. For example, as shown in FIG. 4, the first lens group G1 may include two lenses, and the two lenses may include one lens having positive focal power and one lens having negative focal power. The lens 41 closer to the object side has positive focal power, and the lens 42 closer to the image side has negative focal power. In some other embodiments, the first lens group G1 may include three lenses, and the three lenses may include two lenses having positive focal power and one lens having negative focal power, or include one lens having positive focal power and two lenses having negative focal power. A lens of the three lenses that is closest to the object side has positive focal power. An optical surface of the lens in the first lens group G1 may be a spherical surface or an aspherical surface. Each lens includes two optical surfaces: one faces the object side and is an object-side surface, and the other faces the image side and is an image-side surface.

The second lens group G2 includes at least two lenses. A lens that is in the second lens group G2 and that is closest to the object side has negative focal power. For example, as shown in FIG. 4, the second lens group G2 may include two lenses. A lens 43 closer to the object side has negative focal power, and a lens 44 closer to the image side may have positive focal power or negative focal power. An optical surface of the lens in the second lens group G2 may be a spherical surface or an aspherical surface. In some other embodiments, the second lens group G2 may alternatively include three or four lenses.

The third lens group G3 includes at least two lenses. A lens that is in the third lens group G3 and that is closest to the object side has positive focal power. A lens that is in the third lens group G3 and that is closest to the image side may have negative focal power. In this case, the lens that is closest to the image side and that is with negative focal power can diffuse rays, so that imaging of the zoom lens 4 meets a requirement for an image height, and a requirement for a small aperture size of the third lens group G3 can also be met.

For example, as shown in FIG. 4, the third lens group G3 may include three lenses. In the three lenses, a lens 45 closest to the object side has positive focal power, a lens 47 closest to the image side has negative focal power, and a lens 46 located in the middle has positive focal power. In some other embodiments, the lens located in the middle of the three lenses in the third lens group G3 may have negative focal power. In some other embodiments, the third lens group G3 may include two lenses. A lens closer to the object side has positive focal power, and a lens closer to the image side has a negative focal power. In some other embodiments, the third lens group G3 may alternatively include four lenses.

In some embodiments, the fourth lens group G4 includes at least one lens. A lens that is in the fourth lens group G4 and that is closest to the object side has positive focal power. For example, as shown in FIG. 4, the fourth lens group G4 includes one lens 48 with positive focal power. In some other embodiments, the fourth lens group G4 may include two lenses. A lens closer to the object side has positive focal power, and a lens closer to the image side may have a negative focal power or negative focal power.

In some other embodiments, the second lens group G2 may include one lens, to further reduce a quantity of lenses in the zoom lens 4, so that miniaturization of the zoom lens 4 is easier to implement.

In some embodiments, a ratio of the total track length TTL of the zoom lens 4, from the surface closest to the object side to the image plane 21, to a focal length f1 of the first lens group G1 meets: $0.7 \leq TTL/f1 \leq 3.2$. For example, the value of TTL/f1 may be 0.7, 0.9, 1.5, 1.69, 2.26, 2.8, 3.0, 3.2, or the like.

A ratio of the total track length TTL of the zoom lens 4, from the surface closest to the object side to the image plane 21, to a focal length f2 of the second lens group G2 meets: $-7 \leq TTL/f2 \leq -3$. For example, the value of TTL/f2 may be −7, −5, −4.6, −4.2, −3.5, −3, or the like.

A ratio of the total track length TTL of the zoom lens 4, from the surface closest to the object side to the image plane 21, to a focal length f3 of the third lens group G3 meets: $1.7 \leq TTL/f3 \leq 4.5$. For example, the value of TTL/f3 may be 1.7, 2.3, 3.2, 3.6, 3.89, 4.23, 4.5, or the like.

A ratio of the total track length TTL of the zoom lens 4, from the surface closest to the object side to the image plane 21, to a focal length f4 of the fourth lens group G4 meets: $1 \leq TTL/f4 \leq 2.8$. For example, the value of TTL/f4 may be 1, 1.2, 1.56, 1.9, 2.23, 2.5, 2.8, or the like.

In this embodiment, the zoom lens 4 controls the ratio of the total track length TTL to each of the focal lengths of the four lens groups to be within a specified range, so that better imaging quality is provided in a continuous zoom process.

In some embodiments, the first lens group G1, the second lens group G2, and the third lens group G3 include at least one lens made of glass. In this embodiment, because the first lens group G1, the second lens group G2, and the third lens group G3 include at least one lens made of glass, temperature drift of the zoom lens 4 from −25° C. to 60° C. can be controlled within 30 μm, to improve focusing experience.

An optical surface of the lens made of glass may be a spherical surface or an aspherical surface (asphere). In some embodiments, a 1st lens and a 2nd lens that are in the first lens group G1 and that are arranged from the object side to the image side may be made of glass. In some other embodiments, a lens that is in the third lens group G3 and that is closest to the object side may be made of glass.

The remaining lenses in the zoom lens 4 may be made of plastic, and all the lenses may have an aspherical optical surface. The design of the aspherical surface can improve imaging quality of the zoom lens 4. In some other embodiments, some of the lenses that are made of plastic and that are of the zoom lens 4 may have a spherical optical surface, some of them may have an aspherical optical surface, or all of them have a spherical optical surface.

In some embodiments, as shown in FIG. 4, the third lens group G3 includes an aperture stop 49. The third lens group G3 includes a 1st lens 45 and a 2nd lens 46 that are arranged along the object side to the image side. The aperture stop 49 is located on the object side of the 1st lens 45 in the third lens group G3. In this embodiment, the aperture stop 49 is disposed in the third lens group G3, so that the aperture stop 49 can better constrain rays in the optical system, to improve imaging quality of the zoom lens 4. In some other embodiments, the aperture stop 49 may alternatively be located between the 1st lens 45 and the 2nd lens 46 in the third lens group G3.

In some embodiments, the total track length TTL of the zoom lens 4 meets: TTL≤45 mm. This facilitates miniaturization of the zoom lens 4, so that the zoom lens 4 can be better used in the miniaturized mobile terminal 100.

Figure 5:
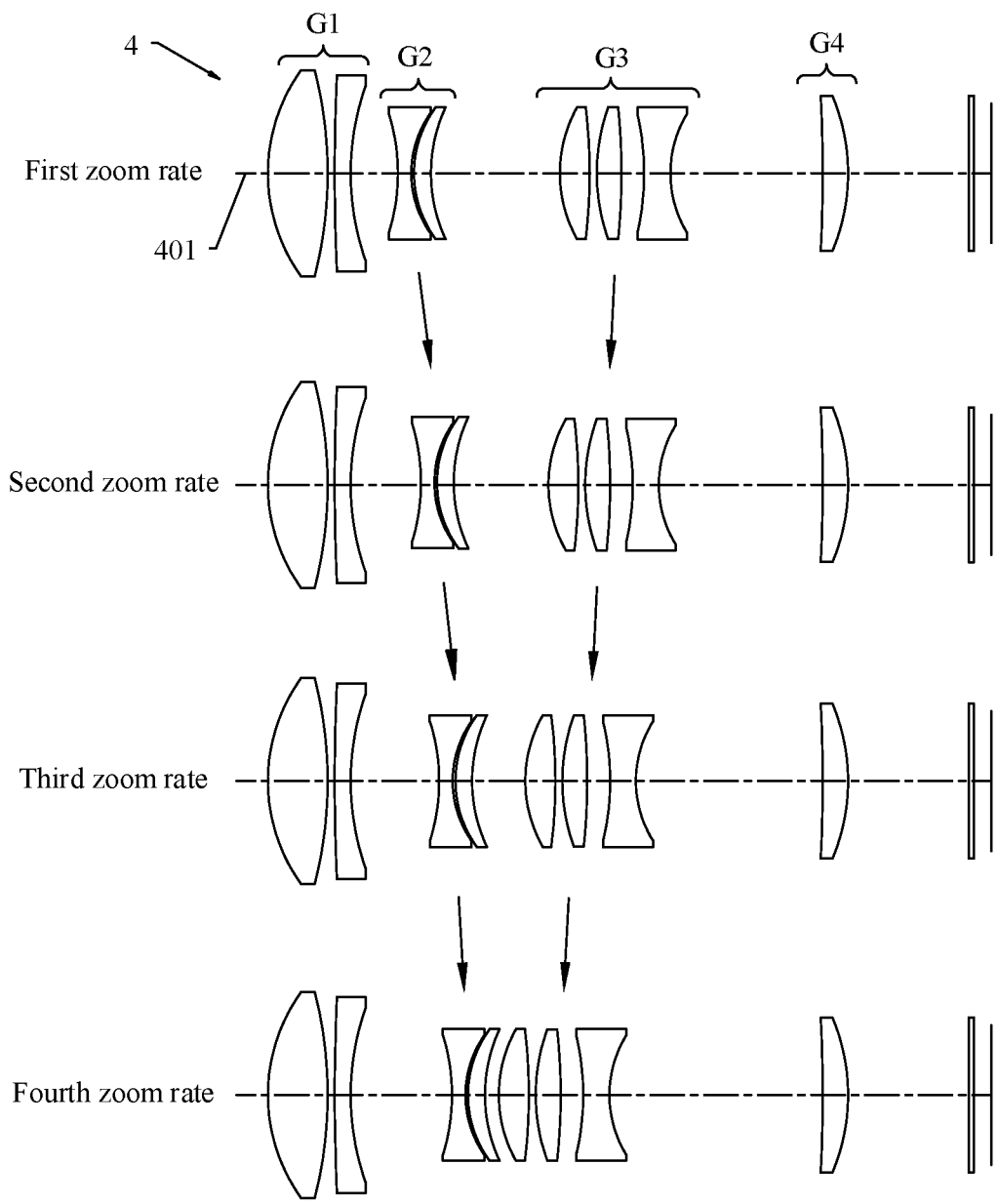
FIG. 5 is a schematic diagram of a structure of a zooming process of the zoom lens shown in FIG. 4.

FIG. 5 is a schematic diagram of a structure of a zooming process of the zoom lens 4 shown in FIG. 4. FIG. 5 mainly shows a structure of lens groups in the zoom lens 4. For ease of description, the optical filter 5 and the image plane 21 of the camera module 40 are also shown.

FIG. 5 shows four focal length statuses of the zoom lens 4: a first zoom rate (also referred to as a short-focal end), a second zoom rate (also referred to as a first intermediate zoom rate), a third zoom rate (also referred to as a second intermediate zoom rate), and a fourth zoom rate (also referred to as a long-focal end). In a process of adjusting the zoom lens 4 from the first zoom rate to the fourth zoom rate, the focal length increases.

As shown in FIG. 5, in some embodiments, in a zooming process of the zoom lens 4 from the short-focal end to the long-focal end, the second lens group G2 moves towards the image side along the optical axis 401, and the third lens group G3 moves towards the object side along the optical axis 401. That is, in a zooming process of the zoom lens 4 from the short-focal end to the long-focal end, the second lens group G2 and the third lens group G3 move towards each other, and movement directions of the second lens group G2 and the third lens group G3 are opposite.

In a zooming process of the zoom lens 4 from the long-focal end to the short-focal end, the second lens group G2 moves towards the object side along the optical axis 401, and the third lens group G3 moves towards the image side along the optical axis 401. That is, in the zooming process of the zoom lens 4 from the short-focal end to the long-focal end, the second lens group G2 and the third lens group G3 move away from each other, and movement directions of the second lens group G2 and the third lens group G3 are opposite.

In this embodiment, because movement directions of the second lens group G2 and the third lens group G3 are opposite during the zooming process, a stroke of a motor (also referred to as a first motor 404) configured to drive the second lens group G2 to move and a stroke of a motor (also referred to as a second motor 405) configured to drive the third lens group G3 to move can be shortened. This reduces difficulties in designing the motors, improves precision for controlling the motors, and further improves imaging quality of the zoom lens 4.

In some embodiments, a ratio of a stroke L1 of the second lens group G2 along the optical axis 401 to the total track length TTL of the zoom lens 4 from a surface closest to the object side to the image plane 21 meets: |L1/TTL|≤0.3. For example, a ratio of the stroke L1 of the second lens group G2 along the optical axis 401 to the total track length TTL of the zoom lens 4 can meet: 0.07≤|L1/TTL|≤0.3. For example, the value of |L1/TTL| may be 0.075, 0.08, 0.095, 0.12, 0.16, 0.25, 0.3, or the like.

In this embodiment, because the ratio of the stroke L1 of the second lens group G2 to the total track length TTL of the zoom lens 4 is less than or equal to 0.3, the stroke L1 of the second lens group G2 can be controlled within a relatively small range, and a requirement for the stroke of a motor (also referred to as the first motor 404) that drives the second lens group G2 to move is low. This reduces difficulties in designing the motor, improves precision for controlling the motor, and further improves imaging quality of the zoom lens 4.

In some embodiments, a ratio of a stroke L2 of the third lens group G3 along the optical axis 401 to the total track length TTL of the zoom lens 4 from the surface closest to the object side to the image plane 21 meets: |L2/TTL|≤0.3. For example, the ratio of the stroke L2 of the third lens group G3 along the optical axis 401 to the total track length TTL of the zoom lens 4 can meet: 0.08≤|L1/TTL|≤0.3. For example, the value of |L1/TTL| may be 0.084, 0.09, 0.13, 0.156, 0.23, 0.26, 0.3, or the like.

In this embodiment, because the ratio of the stroke L2 of the third lens group G3 to the total track length TTL of the zoom lens 4 is less than or equal to 0.3, the stroke L2 of the third lens group G3 can be controlled within a relatively small range, and a requirement for the stroke of the motor (also referred to as the second motor 405) that drives the third lens group G3 to move is low. This difficulties in designing the motor, improves precision for controlling the motor, and further improves imaging quality of the zoom lens 4.

In some embodiments, a ratio of the total track length TTL of the zoom lens 4 from the surface closest to the object side to the image plane 21 to a focal length Fmax at the long-focal end meets: |TTL/Fmax|≤2.0. For example, the value of |TTL/Fmax| may be 0.82, 0.934, 0.96, 1.21, 1.3, 1.42, 1.5, 1.7, 2.0, or the like.

In this embodiment, the zoom lens 4 can implement a relatively long focal length by using a relatively short total track length TTL, so as to effectively reduce a size of the zoom lens 4 while ensuring telephoto shooting, so that the zoom lens 4 is easier to install and has wider applicability.

In some embodiments, a ratio of the focal length Fmax at the long-focal end of the zoom lens 4 to a focal length Fmin at the short-focal end of the zoom lens 4 meets: Fmax/Fmin≤5.0. For example, the value of Fmax/Fmin may be 2.5, 3.3, 3.7, 4.2, 5, or the like.

In this implementation, the ratio of the focal length Fmax at the long-focal end to the focal length Fmin at the short-focal end is controlled. This well achieves trade-off between design difficulties and a requirement for zoom performance of the zoom lens 4, so that the zoom lens 4 achieves trade-off between performance and costs and is more competitive.

Figure 6:
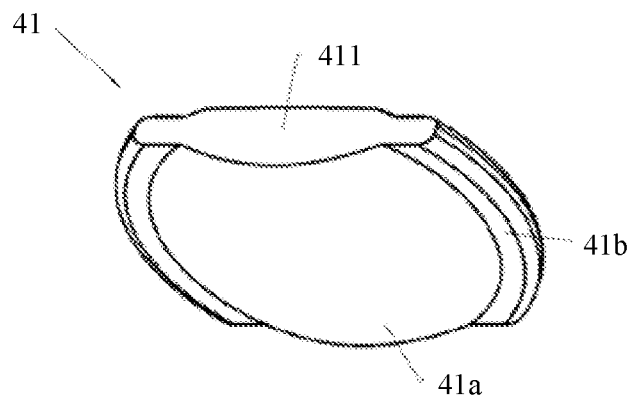
FIG. 6 is a schematic diagram of a structure of a lens in a first lens group in the zoom lens shown in FIG. 4.
Figure 7:
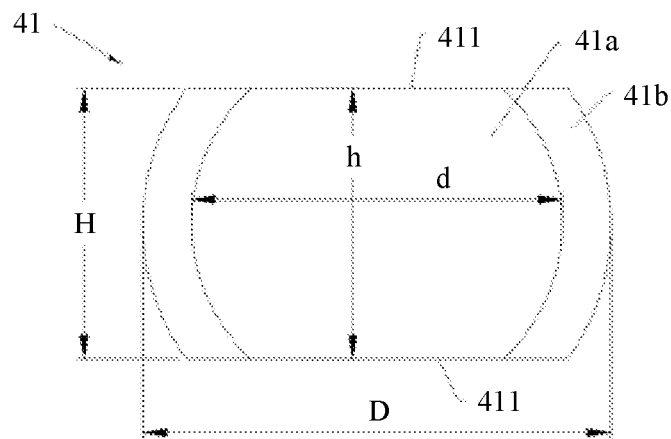
FIG. 7 is a schematic diagram of a structure of the lens shown in FIG. 6 from another angle.

Refer to both FIG. 6 and FIG. 7. FIG. 6 is a schematic diagram of a structure of the lens 41 in the first lens group G1 in the zoom lens 4 shown in FIG. 4, and FIG. 7 is a schematic diagram of a structure of the lens shown in FIG. 6 at another angle.

In some embodiments, the lens 41 includes a lens effective area 41a and a lens ineffective area 41b around the lens effective area 41a. The lens effective area 41a is an area used for refracting rays. The lens effective area 41a is an area in which a lens effective diameter is located. The lens ineffective area 41b is an area that is not used for refracting rays and that can be used for bearing or supporting lens. The lens ineffective area 41b is an area in which a lens ineffective diameter is located. A lens effective area and a lens ineffective area of another lens in the zoom lens 4 are defined in a same manner.

In some embodiments, each lens in the first lens group G1 is provided with a notch for reducing a height of the lens. The notch of each lens included in the first lens group G1 is partially located in the lens effective area, and partially located in the lens ineffective area. As shown in FIG. 7, the lens 41 in the first lens group G1 is provided with notches 411. There are two notches 411, which are respectively disposed on two sides of the lens 41, and notch surfaces of the two notches 411 are parallel to each other. A height H of the lens 41 is a size of the entire lens 41 in a vertical direction of the notch surface. An effective height h of the lens 41 is a size of the lens effective area 41a of the lens 41 in the vertical direction of the notch surface. The effective height h of the lens 41 shown in FIG. 7 is the same as the height H. A maximum aperture diameter d of the lens 41 is a maximum diameter of the lens effective area 41a of the lens 41. A maximum diameter D of the lens 41 is a diameter size of the entire lens. An effective height h, a height H, a maximum aperture diameter d, and a maximum diameter D of another lens in the zoom lens 4 are defined in a same manner. In some other embodiments, there may be one notch 411.

In this embodiment, because the size of the lens in the first lens group G1 is relatively large, the notch is partially located in the lens effective area, and partially located in the lens ineffective area. Although image plane resolution and illumination of the zoom lens 4 are reduced to some extent, the height of the lens in the first lens group G1 can be greatly reduced, so as to greatly reduce the height of the zoom lens 4, and facilitate miniaturization of the zoom lens 4.

In some embodiments, each lens in the fourth lens group G4 is provided with a notch for reducing a height of the lens. The notch of each lens included in the fourth lens group G4 is partially located in the lens effective area, and partially located in the lens ineffective area. In this embodiment, because the size of the lens in the fourth lens group G4 is relatively large, the notch is partially located in the lens effective area, and partially located in the lens ineffective area. Although image plane resolution and illumination of the zoom lens 4 are reduced to some extent, the height of the lens in the fourth lens group G4 can be greatly reduced, so as to greatly reduce the height of the zoom lens 4, and facilitate miniaturization of the zoom lens 4.

Figure 8:
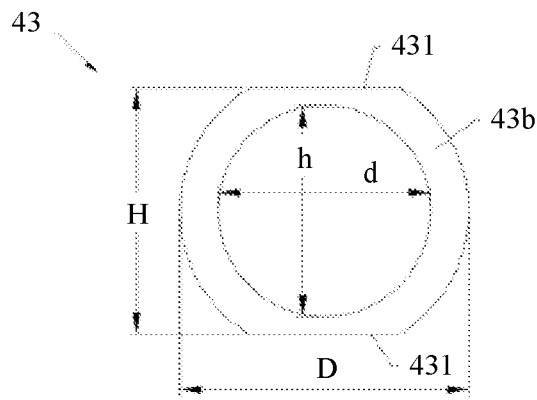
FIG. 8 is a schematic diagram of a structure of a lens in a second lens group in the zoom lens shown in FIG. 4.

FIG. 8 is a schematic diagram of a structure of the lens 43 in the second lens group G2 in the zoom lens 4 shown in FIG. 4.

In some embodiments, each lens in the second lens group G2 is provided with a notch for reducing a height of the lens. The notch of each lens included in the second lens group G2 is located in a lens ineffective area. As shown in FIG. 8, the lens 43 in the second lens group G2 is provided with a notch 431. There are two notches 431, which are respectively disposed on two sides of the lens 43, and notch surfaces of the two notches 431 are parallel to each other. The notch 431 is located in the lens ineffective area 43b of the lens 43. In some other embodiments, there may be one notch 431.

In this embodiment, because the size of the lens in the second lens group G2 is relatively small, and the notch of the second lens group G2 is located in the lens ineffective area, the notch on the lens can reduce the height of the lens in the second lens group G2, without affecting imaging quality of the zoom lens 4.

As shown in FIG. 8, in this embodiment, an effective height h of the lens 43 in the second lens group G2 is equal to the maximum aperture diameter d. A direction in which the effective height h of the lens 43 in the second lens group G2 is located is consistent with a direction in which the effective height h of the lens 41 in the first lens group G1 is located. The effective height h of the lens 43 is less than the height H of the lens 43.

In some embodiments, each lens in the third lens group G3 is provided with a notch for reducing a height of the lens. The notch of each lens included in the third lens group G3 is located in the lens ineffective area. In this embodiment, because the size of the lens in the third lens group G3 is relatively small, and the notch of the third lens group G3 is located in the lens ineffective area, the notch on the lens can reduce the height of the lens in the second lens group G2, without affecting imaging quality of the zoom lens 4.

In some embodiments, as described above, each lens in the zoom lens 4 is provided with a notch for reducing a height of the lens. The notch can be implemented through an I-CUT process. Because each lens in the zoom lens 4 is provided with the notch for reducing the height of the lens, a size in a height direction of an optical system can be effectively reduced, so that the zoom lens 4 has a relatively small height size, and is better applicable to the miniaturized mobile terminal 100. This increases applicability of the zoom lens 4. In addition, because the height of the lens is reduced through notching, a relatively large aperture may be set for the lens, to increase an amount of light admitted by the optical system, and imaging quality of the zoom lens 4 is better.

In some embodiments, a ratio of the effective height h of each lens in the zoom lens 4 to the maximum aperture diameter d meets: $h/d \geq 0.45$. For example, the value of h/d may be 0.45, 0.5, 0.52, 0.6, 0.68, 0.8, or the like. As shown in FIG. 7 and FIG. 8, effective heights h and maximum aperture diameters d of the lens 41 and the lens 43 meet the foregoing requirements. Similarly, an effective height h and a maximum aperture diameter d of another lens in the zoom lens 4 also meet the foregoing requirement.

In this embodiment, the zoom lens 4 controls the ratio of the effective height h of the lens to the maximum aperture diameter d to be greater than or equal to 0.45, so that an optical image of the zoom lens 4 can have a better surface shape and a better resolution while the zoom lens 4 reduces the height of the lens to implement miniaturization.

In some embodiments, the effective height h of each lens in the zoom lens 4 meets: $h \leq 6.5$ mm. For example, the effective height h of the lens may be 3.8 mm, 4 mm, 4.4 mm, 4.8 mm, 5.5 mm, 6.2 mm, 6.5 mm, or the like. In this embodiment, the zoom lens 4 restricts the effective height h of each lens to restrict the height H of each lens in the zoom lens 4, so that the size of the zoom lens 4 can better match the miniaturized mobile terminal 100.

In some embodiments, the maximum aperture diameter d of each lens in the zoom lens 4 meets: $d \leq 10$ mm. For example, the maximum aperture diameter d of the lens may be 7 mm, 7.2 mm, 8 mm, 8.5 mm, 9.2 mm, 10 mm, or the like. In this embodiment, the zoom lens 4 restricts the maximum diameter D of each lens in the zoom lens 4 by restricting the maximum aperture diameter d of each lens, so that the size of the zoom lens 4 can better match the miniaturized mobile terminal 100.

In some embodiments, the working F-number of the zoom lens 4 meets: 2.0≤working F-number≤6.5. In this embodiment, the working F-number is an equivalent aperture F-number of the zoom lens 4 whose lens is notched. When the working F-number meets the foregoing requirement, imaging of the zoom lens 4 can achieve better resolution and better imaging quality. For example, the working F-number of the zoom lens 4 may be 2.0 at the short-focal end, and may be 6.5 at the long-focal end. When the zoom lens 4 is in another zoom rate state, the working F-number may be 2.8, 2.9, 3.1, 3.5, 3.6, 3.75, 3.8, 3.9, 4.2, 4.45, 4.8, 5.5, 6.2, or the like.

In some other embodiments, no notching processing may be performed on the lens in the zoom lens 4, and the lens is a circular lens. The maximum aperture diameter d of each lens in the zoom lens 4 meets: d≤6.5 mm. For example, the maximum aperture diameter d of the lens may be 3.8 mm, 4 mm, 4.4 mm, 4.8 mm, 5.5 mm, 6.2 mm, 6.5 mm, or the like. In this case, a module size of the zoom lens 4 is relatively small, and can be well applicable to the miniaturized mobile terminal 100.

To facilitate understanding of an effect of the zoom lens 4 provided in embodiments of this application, the following describes an imaging effect of the zooming lens 4 in detail with reference to specific embodiments.

In some embodiments, still refer to FIG. 4. A plurality of lens groups in the zoom lens 4 from an object side to an image side are sequentially: a first lens group G1 with positive focal power, where a ratio of a total track length TTL of the zoom lens 4 to a focal length f1 of the first lens group G1 meets: TTL/f1=1.69; a second lens group G2 with negative focal power, where a ratio of the total track length TTL of the zoom lens 4 to a focal length f2 of the second lens group G2 meets: TTL/f2=−4.96; a third lens group G3 with positive focal power, where a ratio of the total track length TTL of the zoom lens 4 to a focal length f3 of the third lens group G3 meets: TTL/f3=3.53; and a fourth lens group G4 with positive focal power, where a ratio of the total track length TTL of the zoom lens 4 to a focal length f4 of the fourth lens group G4 meets: TTL/f4=1.98.

The zoom lens 4 includes eight lenses with focal powers, and each lens is designed with an aspherical surface. The first lens group G1 includes two lenses (41 and 42). Along a direction from the object side to the image side, focal powers of the two lenses (41 and 42) are respectively positive and negative. The second lens group G2 includes two lenses (43 and 44). Along the direction from the object side to the image side, focal powers of the two lenses (43, 44) are respectively negative and positive. The third lens group G3 includes three lenses (45, 46, 47). Along the direction from the object side to the image side, focal powers of the three lenses (45, 46, 47) are respectively positive, positive, and negative. The fourth lens group G4 includes one lens 48, and a focal power of the lens 48 is positive. The third lens group G3 includes an aperture stop 49, and the aperture stop 49 is located on the object side of the lens 45 that is in the third lens group G3 and that is closest to the object. Both the two lenses in the first lens group G1 are made of glass, and other lenses in the zoom lens 4 are made of plastic. A maximum effective height h of all the lenses in the zoom lens 4 is 4.6 mm. A maximum aperture diameter d of all the lenses in the zoom lens 4 is 7 mm.

Refer to both Table 1a and Table 1b. Table 1a shows curvature radiuses, thickness, refractive indexes (Nd), and Abbe coefficients (Vd) of lenses and the optical filter 5 in the zoom lens 4 in the first zoom rate (short-focal end) state. The thickness includes lens thickness (corresponding to d1 to d9) and air thickness (corresponding to a1 to a9) between lenses. Table 1b shows aspheric coefficients of lenses.

TABLE 1a

| | No. | Curvature radius | | Thickness | Refractive index | Abbe coefficient |
|---|---|---|---|---|---|---|
| First lens group | S1 | 6.6486 | d1 | 2.2174 | 1.55 | 71.68 |
| | S2 | −13.5631 | a1 | 0.2612 | | |
| | S3 | −176.8228 | d2 | 0.5835 | 1.83 | 37.37 |
| | S4 | 13.0236 | a2 | 3.7420 | | |
| First lens group | S5 | −7.0638 | d3 | 0.5000 | 1.54 | 55.65 |
| | S6 | 3.3919 | a3 | 0.0700 | | |
| | S7 | 3.2811 | d4 | 0.6654 | 1.67 | 19.40 |
| | S8 | 4.5197 | a4 | 0.5000 | | |
| First lens group | S9 | 4.4238 | d5 | 1.1268 | 1.54 | 55.65 |
| | S10 | −13.3466 | a5 | 0.2389 | | |
| | S11 | 8.3465 | d6 | 0.8923 | 1.54 | 55.65 |
| | S12 | −47.1794 | a6 | 0.8864 | | |
| | S13 | −10.7190 | d7 | 0.9473 | 1.67 | 19.40 |
| | S14 | 4.7705 | a7 | 7.9399 | | |
| First lens group | S15 | −84.6615 | d8 | 0.9343 | 1.67 | 19.40 |
| | S16 | −8.3100 | a8 | 4.4835 | | |
| Optical filter | S17 | Infinity | d9 | 0.2100 | 1.52 | 64.16 |
| | S18 | Infinity | a9 | 0.6000 | | |

TABLE 1b

| | A2 | A3 | A4 | A5 | A6 |
|---|---|---|---|---|---|
| S1 | 2.3520E−04 | −9.8499E−06 | 3.3412E−06 | −5.4469E−07 | 3.5400E−08 |
| S2 | 5.6822E−04 | −5.6871E−06 | −1.4949E−06 | 9.0318E−08 | −1.7962E−09 |
| S3 | −1.1863E−04 | 2.0210E−05 | 1.3008E−06 | −8.7437E−08 | 1.1553E−08 |
| S4 | 3.8726E−04 | 2.5387E−05 | 7.6665E−06 | −9.8939E−07 | 7.6693E−08 |
| S5 | 8.4840E−04 | 1.2920E−04 | −3.4964E−05 | 3.8848E−06 | −1.3516E−07 |
| S6 | −2.6714E−03 | −2.2106E−04 | −3.0891E−05 | 7.4065E−06 | −1.2441E−06 |
| S7 | −3.9770E−03 | −4.3548E−04 | −1.2143E−05 | 1.6198E−06 | −1.5182E−07 |
| S8 | −3.0123E−03 | −1.2591E−04 | −2.1035E−05 | 1.9545E−06 | 1.9836E−07 |
| S9 | −1.4439E−03 | −1.0714E−05 | −7.2573E−08 | 3.7127E−07 | −1.2755E−07 |
| S10 | 1.6967E−03 | −7.9250E−06 | 1.3398E−05 | −1.5608E−06 | 1.5051E−07 |
| S11 | 9.2060E−04 | 6.4419E−05 | 1.1791E−05 | 2.1889E−06 | 1.4541E−07 |
| S12 | −1.7617E−03 | 2.5569E−05 | 6.9613E−06 | 3.0259E−06 | 9.7969E−07 |
| S13 | 3.0188E−03 | −1.0463E−03 | 1.3200E−04 | −5.5466E−06 | −1.3764E−06 |
| S14 | 7.7252E−03 | −7.8578E−04 | 1.3869E−04 | −6.9097E−06 | −2.3711E−06 |
| S15 | −6.1255E−04 | −1.1719E−04 | 2.6577E−05 | −6.5578E−06 | 9.1400E−07 |
| S16 | −5.5749E−04 | −7.7860E−05 | 1.2702E−05 | −3.7454E−06 | 5.7849E−07 |

It can be learned from Table 1a that the total track length TTL of the zoom lens 4 from the surface closest to the object side to the image plane 21 is 26.7990 mm.

In the 16 aspherical surfaces of the zoom lens 4 shown in Table 1b, surface type z of each even-order aspherical surface may be defined by using but not limited to the following aspherical surface formula:

$$z = \frac{cr^2}{1+\sqrt{1-Kc^2r^2}} + A_2r^4 + A_3r^6 + A_4r^8 + A_5r^{10} + A_6r^{12}$$

z is a vector height of an aspherical surface, r is a radial coordinate of the aspherical surface, c is a spherical curvature of a vertex of the aspherical surface, K is a quadratic surface constant, and a value of K in this embodiment is 0. A2, A3, A4, A5, and A6 are aspheric coefficients.

It can be seen from FIG. 5 that, in the process in which the zoom lens 4 zooms from the short-focal end to the long-focal end, the second lens group G2 moves towards the image side, and the third lens group G3 moves towards the object side. A ratio of a stroke L1 of the second lens group G2 along the optical axis 401 to a total track length TTL of the zoom lens 4 from a surface closest to the object side to the image plane 21 meets: |L1/TTL|=0.075. A ratio of a stroke L2 of the third lens group G3 along the optical axis 401 to a total track length TTL of the zoom lens 4 from the surface closest to the object side to the image plane 21: |L2/TTL|=0.084. A ratio of the total track length TTL of the zoom lens 4 from the surface closest to the object side to the image plane 21 to a focal length Fmax at the long-focal end meets: |TTL/Fmax|=0.934.

Refer to both Table 1c and Table 1d. Table 1c shows basic parameters of the zoom lens 4, and Table 1d shows thickness between lens groups in the zoom lens 4 in a plurality of zoom rate statuses.

TABLE 1c

| Rate | I | II | III | 4 |
|---|---|---|---|---|
| Focal Length (mm) | 15 | 18.5 | 23.5 | 29 |
| Working F-number | 3.5 | 3.5 | 3.7 | 3.9 |
| Image height IMH | 2.5 mm | 2.5 mm | 2.5 mm | 2.5 mm |

TABLE 1d

| Rate | | I | II | III | 4 |
|---|---|---|---|---|---|
| Focal Length (mm) | | 15 | 18.5 | 23.5 | 29 |
| Thickness | a2 | 1.7455 | 2.5965 | 3.2764 | 3.7420 |
| | a4 | 4.7482 | 3.5115 | 1.9619 | 0.5000 |
| | a7 | 5.6881 | 6.0739 | 6.9436 | 7.9399 |

Simulation is performed on the zoom lens 4 shown in FIG. 4. The following describes simulation effects of the zoom lens 4 in detail with reference to the accompanying drawings.

Figure 9:
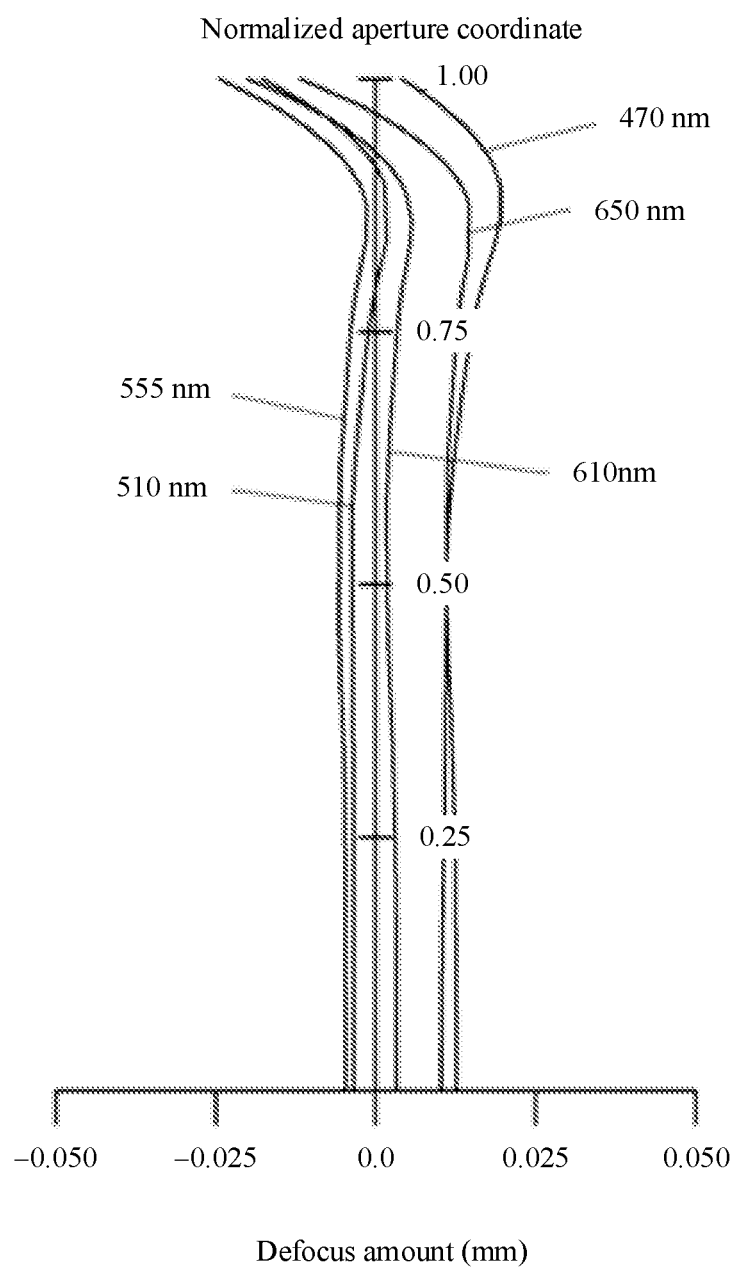
FIG. 9 is an axial spherical aberration curve of the zoom lens shown in FIG. 4 at a first zoom rate.

FIG. 9 is an axial spherical aberration curve of the zoom lens 4 shown in FIG. 4 at a first zoom rate. The five curves represent wavelengths 650 nm, 610 nm, 555 nm, 510 nm, and 470 nm respectively, and the center wavelength is 555 nm. It can be seen from FIG. 9 that, in normalized aperture coordinates, a defocus amount of the center wavelength is less than 10 um, a difference between a defocus amount of any wavelength and the defocus amount of the center wavelength is controlled within a small range.

Figure 10:
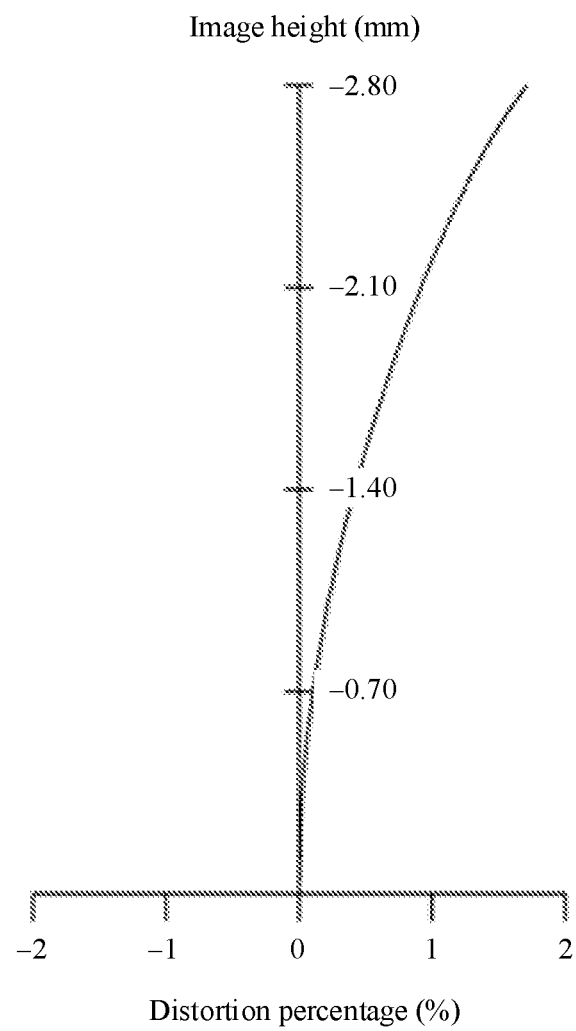
FIG. 10 is a distortion curve of the zoom lens shown in FIG. 4 at the first zoom rate.

FIG. 10 is a distortion curve of the zoom lens 4 shown in FIG. 4 at the first zoom rate. It can be seen from the distortion curve in FIG. 10 that the distortion at a maximum image height is controlled within 2%, which meets the imaging requirement.

Figure 11:
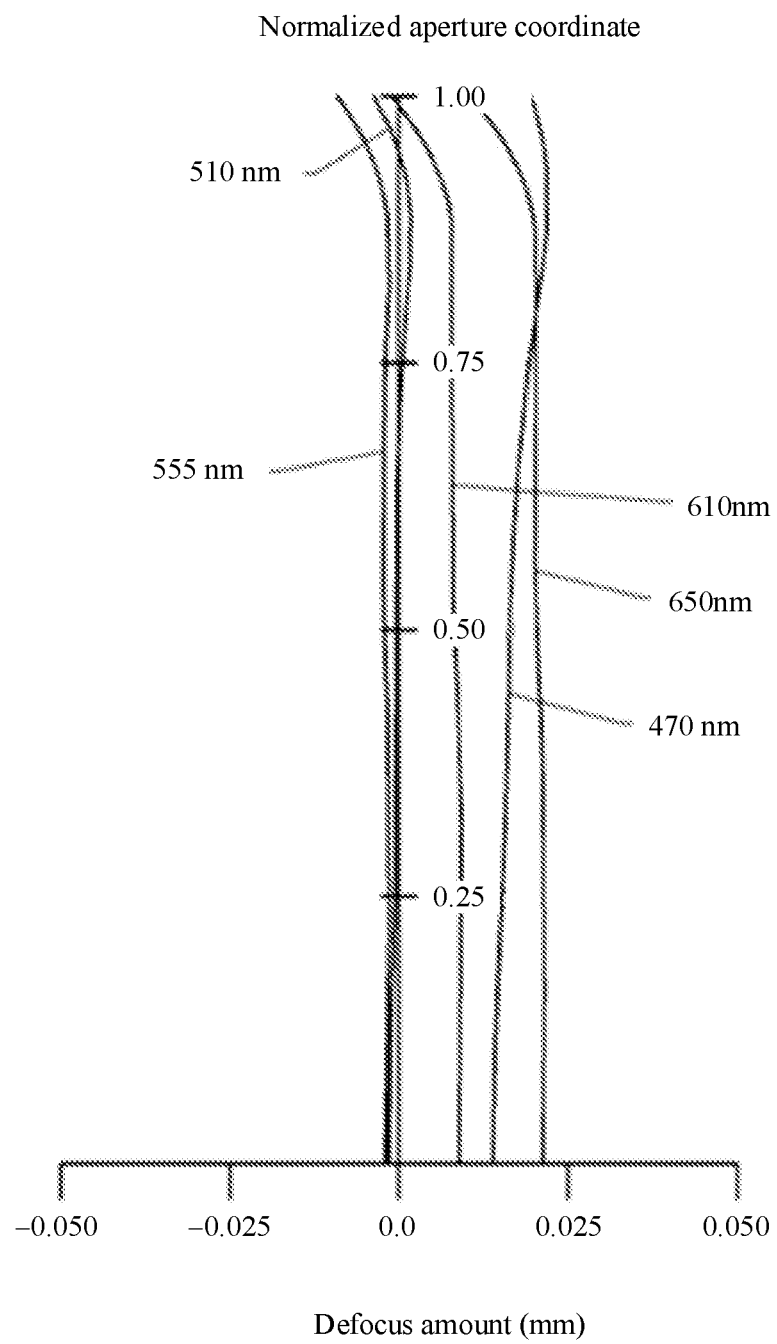
FIG. 11 is an axial spherical aberration curve of the zoom lens shown in FIG. 4 at a second zoom rate.

FIG. 11 is an axial spherical aberration curve of the zoom lens 4 shown in FIG. 4 at a second zoom rate. The five curves represent wavelengths 650 nm, 610 nm, 555 nm, 510 nm, and 470 nm respectively, and the center wavelength is 555 nm. It can be seen from FIG. 11 that, in normalized aperture coordinates, a defocus amount of the center wavelength is less than 10 um, a difference between a defocus amount of any wavelength and the defocus amount of the center wavelength is controlled within a small range.

Figure 12:
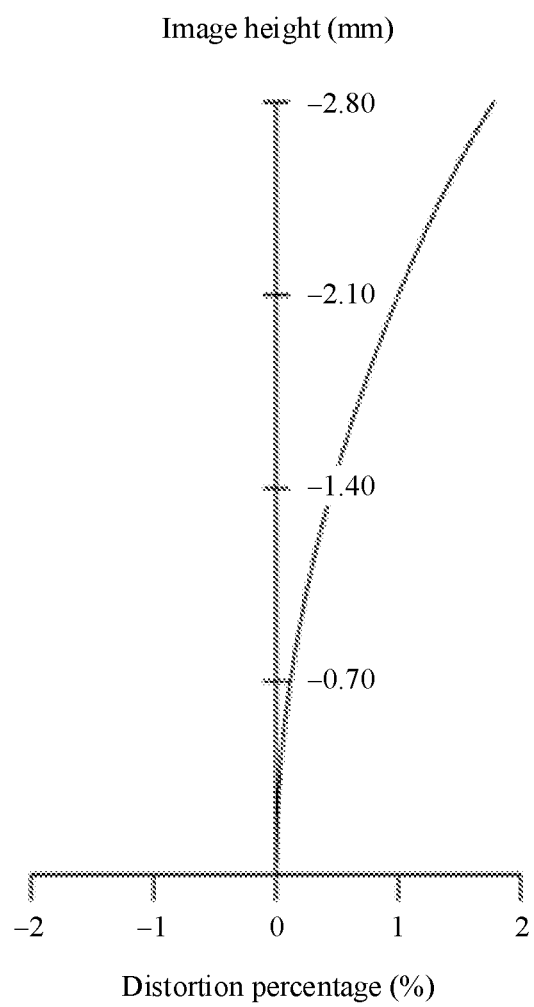
FIG. 12 is a distortion curve of the zoom lens shown in FIG. 4 at the second zoom rate.

FIG. 12 is a distortion curve of the zoom lens 4 shown in FIG. 4 at the second zoom rate. It can be seen from the distortion curve in FIG. 12 that the distortion at a maximum image height is controlled within 2%, which meets the imaging requirement.

Figure 13:
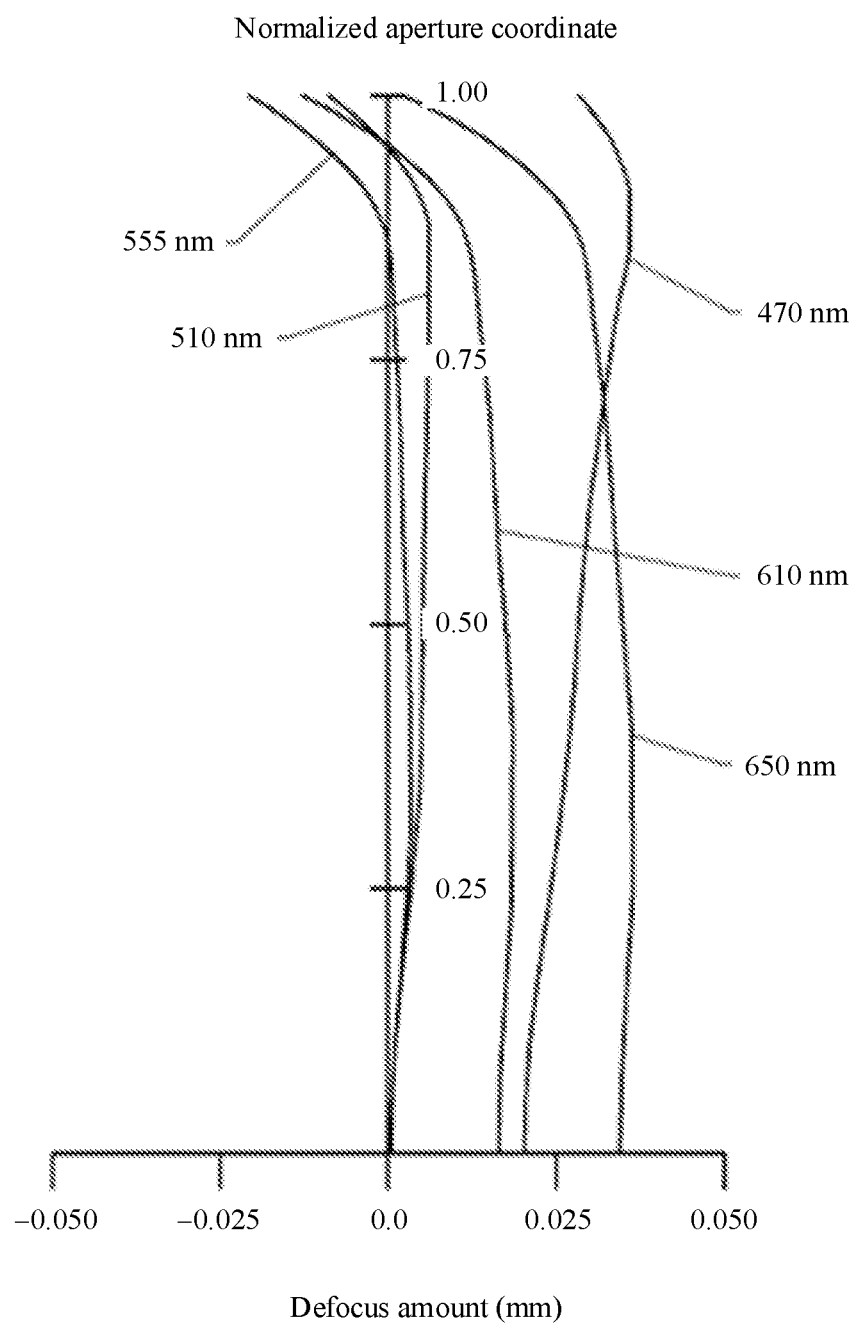
FIG. 13 is an axial spherical aberration curve of the zoom lens shown in FIG. 4 at a third zoom rate.

FIG. 13 is an axial spherical aberration curve of the zoom lens 4 shown in FIG. 4 at a third zoom rate. The five curves represent wavelengths 650 nm, 610 nm, 555 nm, 510 nm, and 470 nm respectively, and the center wavelength is 555 nm. It can be seen from FIG. 13 that, in normalized aperture coordinates, a defocus amount of the center wavelength is less than 10 um, a difference between a defocus amount of any wavelength and the defocus amount of the center wavelength is controlled within a small range.

Figure 14:
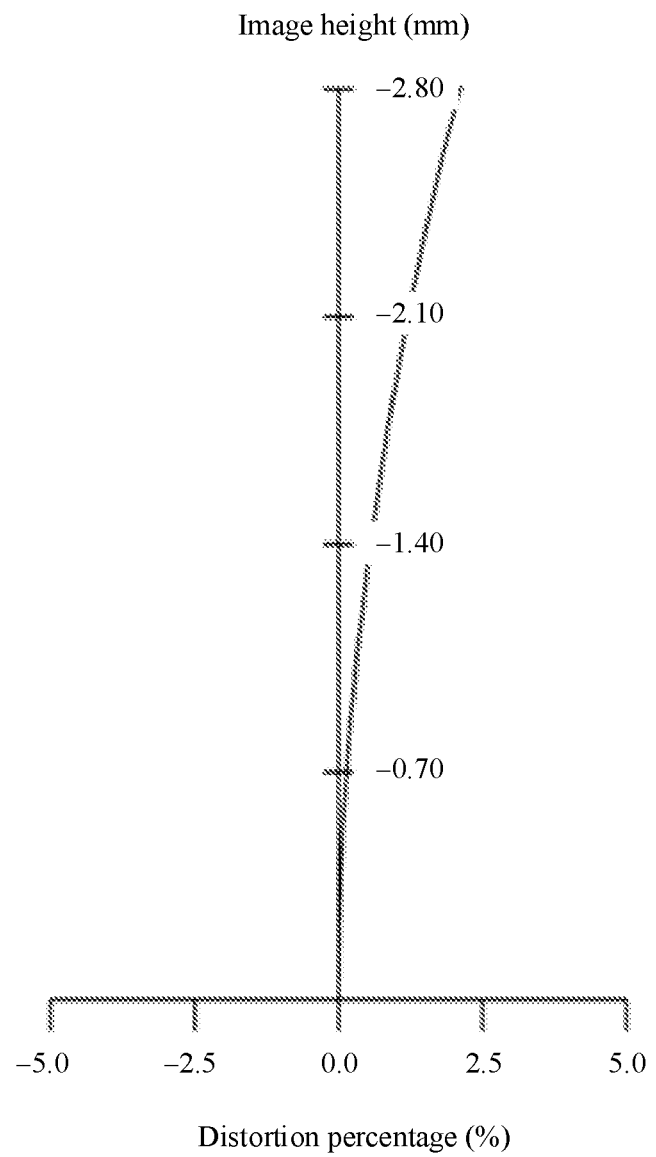
FIG. 14 is a distortion curve of the zoom lens shown in FIG. 4 at the third zoom rate.

FIG. 14 is a distortion curve of the zoom lens 4 shown in FIG. 4 at the third zoom rate. It can be seen from the distortion curve in FIG. 14 that the distortion at a maximum image height is controlled within 2%, which meets the imaging requirement.

Figure 15:
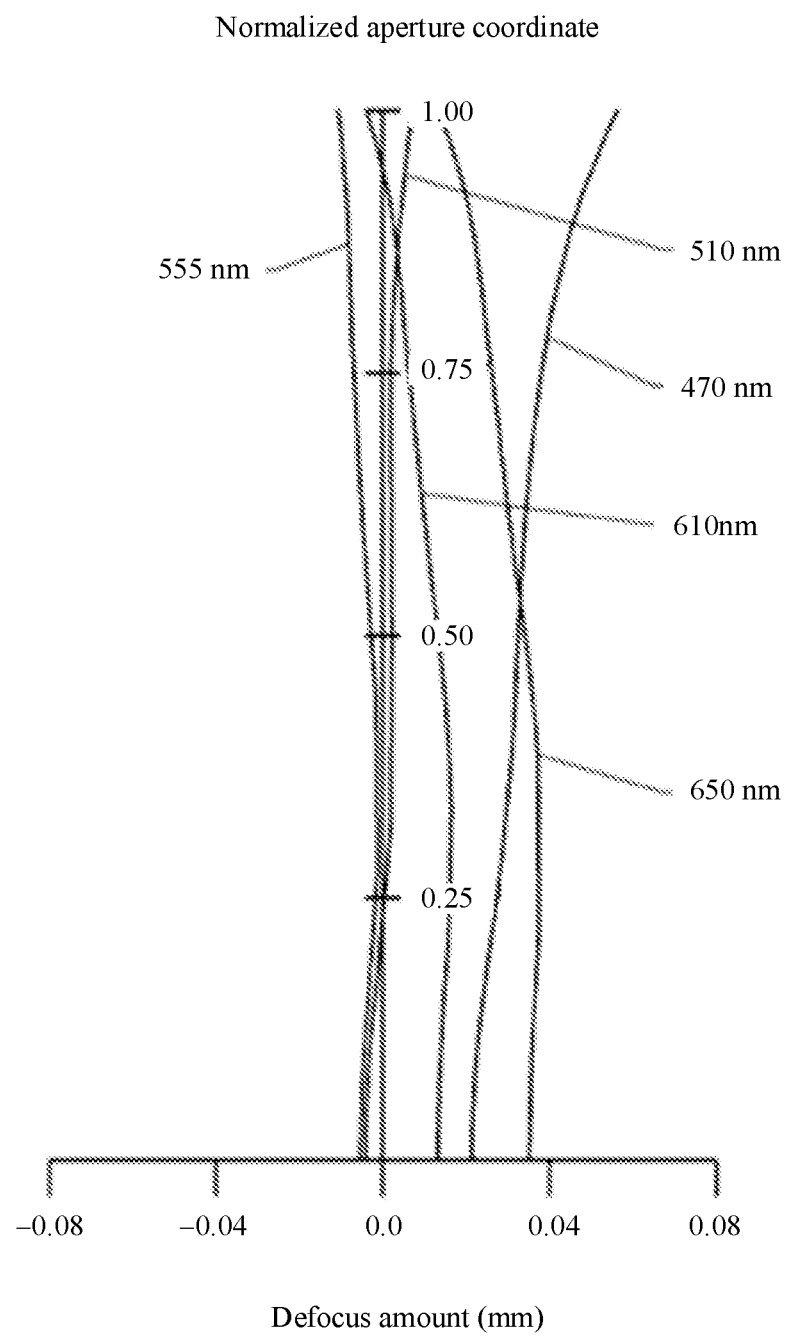
FIG. 15 is an axial spherical aberration curve of the zoom lens shown in FIG. 4 at a fourth zoom rate.

FIG. 15 is an axial spherical aberration curve of the zoom lens 4 shown in FIG. 4 at a fourth zoom rate. The five curves represent wavelengths 650 nm, 610 nm, 555 nm, 510 nm, and 470 nm respectively, and the center wavelength is 555 nm. It can be seen from FIG. 15 that, in normalized aperture coordinates, a defocus amount of the center wavelength is less than 10 um, a difference between a defocus amount of any wavelength and the defocus amount of the center wavelength is controlled within a small range.

Figure 16:
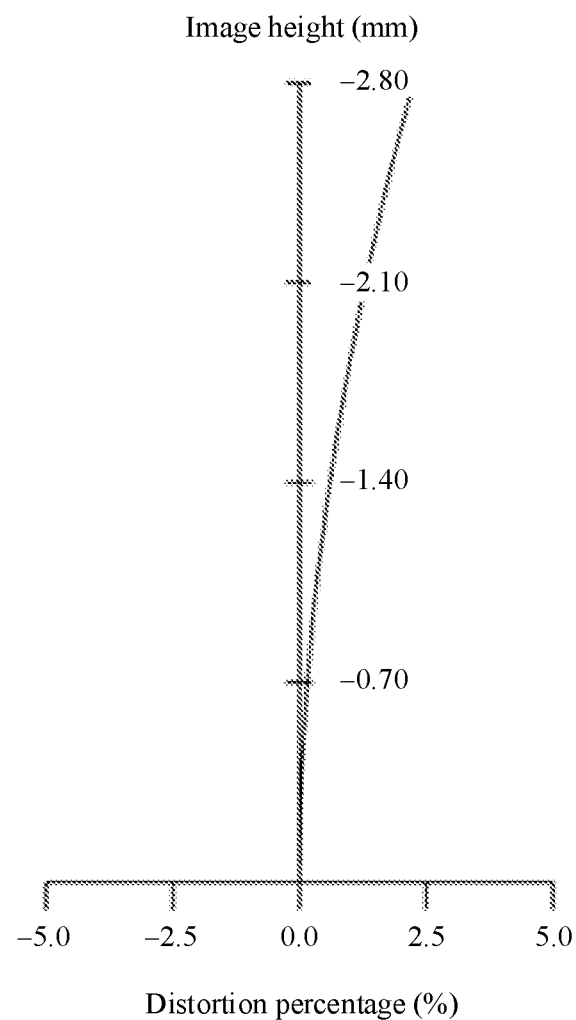
FIG. 16 is a distortion curve of the zoom lens shown in FIG. 4 at the fourth zoom rate.

FIG. 16 is a distortion curve of the zoom lens 4 shown in FIG. 4 at a fourth zoom rate. It can be seen from the distortion curve in FIG. 16 that the distortion at a maximum image height is controlled within 2%, which meets the imaging requirement.

Figure 17:
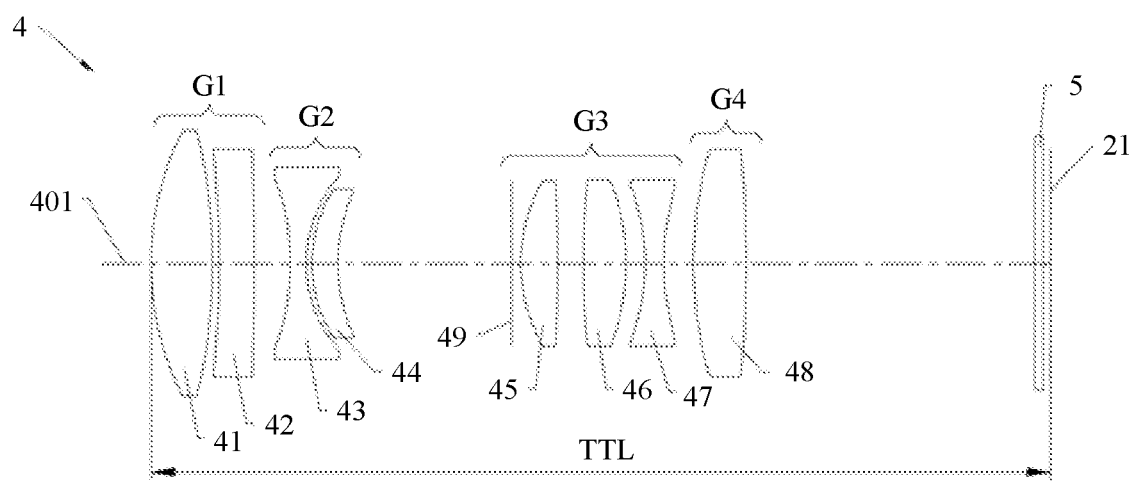
FIG. 17 is a schematic diagram of a partial structure of the zoom lens shown in FIG. 3 in some other embodiments.
Figure 18:
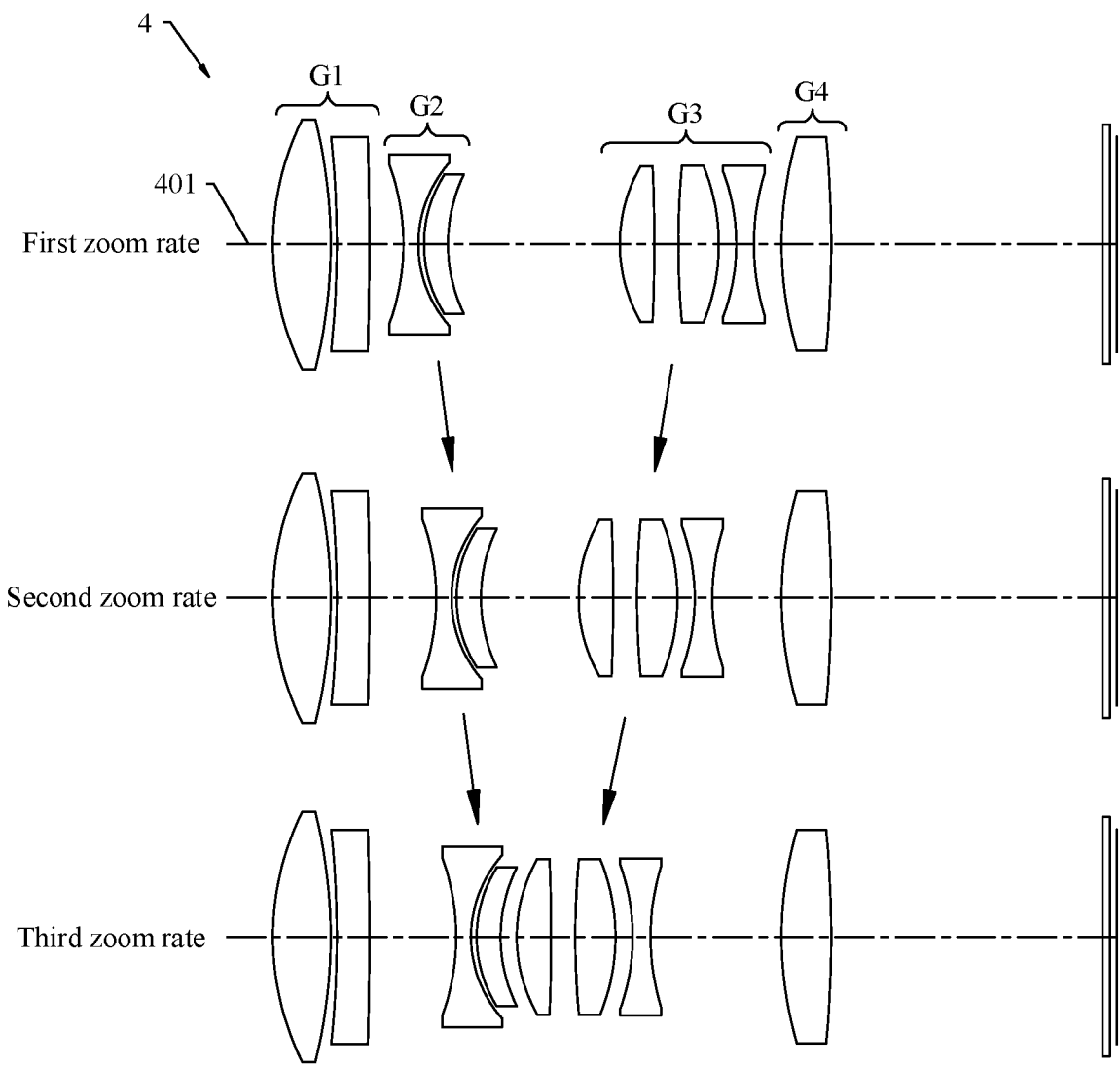
FIG. 18 is a schematic diagram of a structure of a zooming process of the zoom lens shown in FIG. 17.

Refer to both FIG. 17 and FIG. 18. FIG. 17 is a schematic diagram of a partial structure of the zoom lens 4 shown in FIG. 3 in some other embodiments, and FIG. 18 is a schematic diagram of a structure of a zoom process of the zoom lens 4 shown in FIG. 17. FIG. 17 and FIG. 18 mainly show structures of a plurality of lens groups in the zoom lens 4. For ease of description, the optical filter 5 and the image plane 21 of the camera module 40 are also shown.

In some embodiments, the zoom lens 4 includes a plurality of lens groups. The plurality of lens groups from an object side to an image side are sequentially: a first lens group G1 with positive focal power, where a ratio of a total track length TTL of the zoom lens 4 to a focal length f1 of the first lens group G1 meets: TTL/f1=2.26; a second lens group G2 with negative focal power, where a ratio of the total track length TTL of the zoom lens 4 to a focal length f2 of the second lens group G2 meets: TTL/f2=−5.74; a third lens group G3 with positive focal power, where a ratio of the total track length TTL of the zoom lens 4 to a focal length f3 of the third lens group G3 meets: TTL/f3=2.72; and a fourth lens group G4 with positive focal power, where a ratio of the total track length TTL of the zoom lens 4 to a focal length f4 of the fourth lens group G4 meets: TTL/f4=1.84. The second lens group G2 and the third lens group G3 can move along the optical axis 401, so that the zoom lens 4 implements continuous zooming.

The zoom lens 4 includes eight lenses with focal powers, and each lens is designed with an aspherical surface. The first lens group G1 includes two lenses (41 and 42). Along a direction from the object side to the image side, focal powers of the two lenses (41 and 42) are respectively positive and negative. The second lens group G2 includes two lenses (43 and 44). Along the direction from the object side to the image side, focal powers of the two lenses (43, 44) are respectively negative and positive. The third lens group G3 includes three lenses (45, 46, 47). Along the direction from the object side to the image side, focal powers of the three lenses (45, 46, 47) are respectively positive, positive, and negative. The fourth lens group G4 includes one lens 48, and a focal power of the lens 48 is positive. The third lens group G3 includes an aperture stop 49, and the aperture stop 49 is located on the object side of the lens 45 that is in the third lens group G3 and that is closest to the object. Both the two lenses in the first lens group G1 are made of glass, and other lenses in the zoom lens 4 are made of plastic. A maximum effective height h of all the lenses in the zoom lens 4 is 4.6 mm. A maximum aperture diameter d of all the lenses in the zoom lens 4 is 7 mm.

Refer to both Table 2a and Table 2b. Table 2a shows curvature radiuses, thickness, refractive indexes (Nd), and Abbe coefficients (Vd) of lenses and the optical filter 5 in the zoom lens 4 in the first zoom rate (short-focal end) state. The thickness includes lens thickness (corresponding to d1 to d9) and air thickness (corresponding to a1 to a9) between lenses. Table 2b shows aspheric coefficients of lenses.

TABLE 2a

|  | No. | Curvature radius |  | Thickness | Refractive index | Abbe coefficient |
|---|---|---|---|---|---|---|
| First lens group G1 | S1 | 8.6534 | d1 | 1.7882 | 1.55 | 64.85 |
|  | S2 | −12.7335 | a1 | 0.2170 |  |  |
|  | S3 | −23.9969 | d2 | 1.0000 | 1.74 | 29.66 |
|  | S4 | −61.8215 | a2 | 1.0303 |  |  |
| First lens group G1 | S5 | −7.5135 | d3 | 0.5000 | 1.54 | 55.65 |
|  | S6 | 3.6980 | a3 | 0.1335 |  |  |
|  | S7 | 3.7170 | d4 | 0.7395 | 1.67 | 19.40 |
|  | S8 | 3.8694 | a4 | 5.2915 |  |  |
| First lens group G1 | S9 | 4.4711 | d5 | 1.0760 | 1.54 | 55.65 |
|  | S10 | −36.1596 | a5 | 0.7266 |  |  |
|  | S11 | 91.1446 | d6 | 1.2284 | 1.54 | 55.65 |
|  | S12 | −6.6710 | a6 | 0.5391 |  |  |
|  | S13 | −6.4477 | d7 | 0.5618 | 1.67 | 19.40 |
|  | S14 | 12.4594 | a7 | 0.8681 |  |  |
| First lens group G1 | S15 | 11.4076 | d8 | 1.5000 | 1.67 | 19.40 |
|  | S16 | −62.0367 | a8 | 8.4000 |  |  |
| Optical filter 5 | S17 | Infinity | d9 | 0.2100 | 1.52 | 64.16 |
|  | S18 | Infinity | a9 | 0.6000 |  |  |

TABLE 2b

|  | A2 | A3 | A4 | A5 |
|---|---|---|---|---|
| S1 | 2.8637E−04 | 3.8684E−06 | −4.2620E−07 | 7.3726E−08 |
| S2 | 5.8216E−04 | 5.9809E−06 | −5.2066E−07 | −1.0775E−08 |
| S3 | −1.5865E−05 | 3.4675E−05 | −9.7146E−07 | 8.1338E−08 |
| S4 | 2.0856E−04 | 1.8389E−05 | 1.5785E−06 | 1.2001E−08 |
| S5 | −1.7600E−03 | 5.3202E−04 | −4.3787E−05 | 1.3259E−06 |
| S6 | −2.2220E−03 | 1.2780E−04 | 1.8649E−05 | −3.0055E−06 |
| S7 | −4.7292E−03 | −1.0511E−04 | −3.1927E−05 | −2.3796E−06 |

TABLE 2b-continued

|  | A2 | A3 | A4 | A5 |
|---|---|---|---|---|
| S8 | −8.4418E−03 | 3.2980E−04 | −1.1562E−04 | 3.6387E−06 |
| S9 | −6.3032E−04 | 7.1788E−05 | −3.4448E−05 | −2.0051E−06 |
| S10 | 1.1280E−03 | 7.2749E−04 | −2.0327E−04 | 1.5390E−05 |
| S11 | −1.6115E−03 | 1.6784E−03 | −3.4539E−04 | 3.1945E−05 |
| S12 | −4.1300E−03 | 2.5682E−03 | −5.8130E−04 | 4.4246E−05 |
| S13 | 5.3578E−03 | 3.4464E−04 | −4.9123E−04 | 4.3943E−05 |
| S14 | 9.8357E−03 | −9.7782E−04 | −8.0872E−05 | 1.7086E−05 |
| S15 | −3.8106E−04 | −5.2361E−05 | 1.5201E−05 | −1.3621E−06 |
| S16 | −3.7951E−04 | −6.2587E−05 | 1.5464E−05 | −1.2646E−06 |

It can be learned from Table 2a that the total track length TTL of the zoom lens 4 from the surface closest to the object side to the image plane 21 is 26.4099 mm.

In the 16 aspherical surfaces of the zoom lens 4 shown in Table 2b, surface type z of each even-order aspherical surface may be defined by using but not limited to the following aspherical surface formula:

$$z = \frac{cr^2}{1 + \sqrt{1 - Kc^2r^2}} + A_2r^4 + A_3r^6 + A_4r^8 + A_5r^{10}$$

z is a vector height of an aspherical surface, r is a radial coordinate of the aspherical surface, c is a spherical curvature of a vertex of the aspherical surface, K is a quadratic surface constant, and a value of K in this embodiment is 0. A2, A3, A4, and A5 are aspheric coefficients.

FIG. 18 shows three focal length statuses of the zoom lens 4: a first zoom rate (also referred to as a short-focal end), a second zoom rate (also referred to as an intermediate zoom rate), and a third zoom rate (that is, a long-focal end). In a process of adjusting the zoom lens 4 from the first zoom rate to the third zoom rate, the focal length increases.

It can be seen from FIG. 18 that, in the process in which the zoom lens 4 zooms from the short-focal end to the long-focal end, the second lens group G2 moves towards the image side, and the third lens group G3 moves towards the object side. A ratio of a stroke L1 of the second lens group G2 along the optical axis 401 to a total track length TTL of the zoom lens 4 from a surface closest to the object side to the image plane 21: |L1/TTL|=0.0622. A ratio of a stroke L2 of the third lens group G3 along the optical axis 401 to a total track length TTL of the zoom lens 4 from the surface closest to the object side to the image plane 21: |L2/TTL|=0.1192. A ratio of the total track length TTL of the zoom lens 4 from the surface closest to the object side to the image plane 21 to a focal length Fmax at the long-focal end meets: |TTL/Fmax|=1.12.

Refer to both Table 2c and Table 2d. Table 2c shows basic parameters of the zoom lens 4, and Table 2d shows thickness between lens groups in the zoom lens 4 in a plurality of zoom rate statuses.

TABLE 2c

| Rate | I | II | III |
|---|---|---|---|
| Focal Length (mm) | 11.8 | 17 | 23.5 |
| Working F-number | 3.5 | 3.6 | 3.8 |
| Image height IMH | 3.28 mm | 3.28 mm | 3.28 mm |

TABLE 2d

| Rate | | I | II | III |
|---|---|---|---|---|
| Focal Length (mm) | | 11.8 | 17 | 23.5 |
| Thickness | a2 | 1.0303 | 2.0527 | 2.6736 |
| | a4 | 5.2915 | 2.9942 | 0.5000 |
| | a7 | 0.8681 | 2.1429 | 4.0163 |

Simulation is performed on the zoom lens 4 shown in FIG. 17. The following describes simulation effects of the zoom lens 4 in detail with reference to the accompanying drawings.

Figure 19:
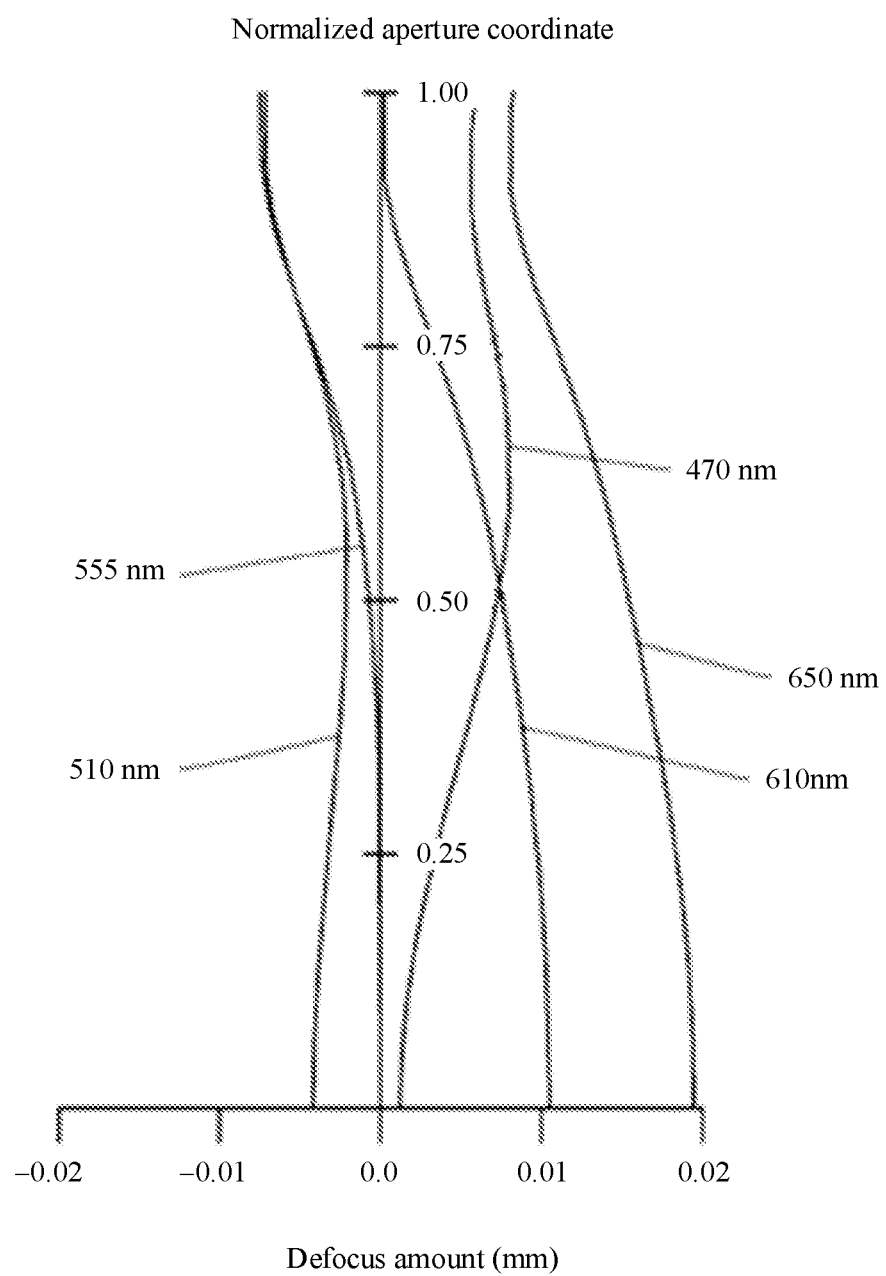
FIG. 19 is an axial spherical aberration curve of the zoom lens shown in FIG. 17 at a first zoom rate.

FIG. 19 is an axial spherical aberration curve of the zoom lens 4 shown in FIG. 17 at a first zoom rate. The five curves represent wavelengths 650 nm, 610 nm, 555 nm, 510 nm, and 470 nm respectively, and the center wavelength is 555 nm. It can be seen from FIG. 19 that, in normalized aperture coordinates, a defocus amount of the center wavelength is less than 10 um, a difference between a defocus amount of any wavelength and the defocus amount of the center wavelength is controlled within a small range.

Figure 20:
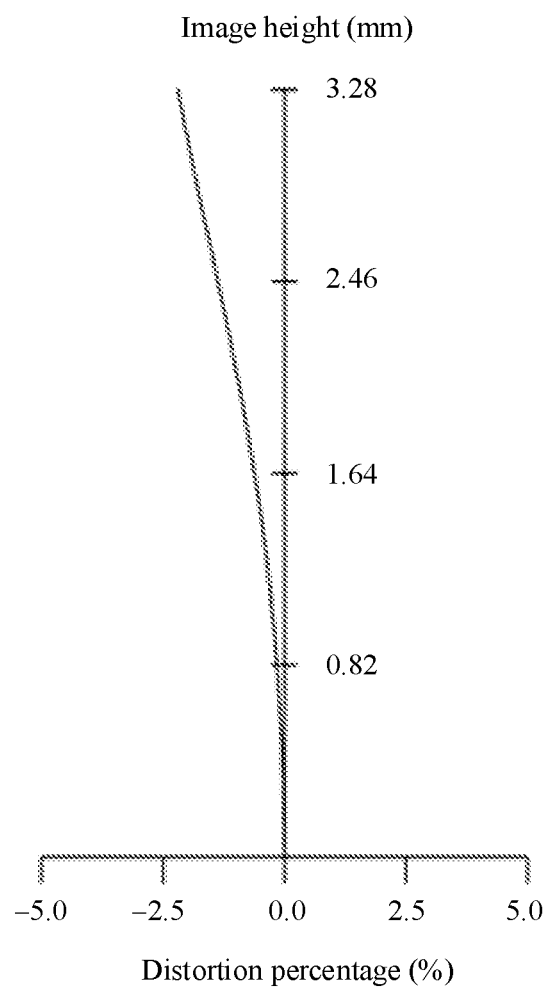
FIG. 20 is a distortion curve of the zoom lens shown in FIG. 17 at the first zoom rate.

FIG. 20 is a distortion curve of the zoom lens 4 shown in FIG. 17 at the first zoom rate. It can be seen from the distortion curve in FIG. 20 that the distortion at a maximum image height is controlled within 2%, which meets the imaging requirement.

Figure 21:
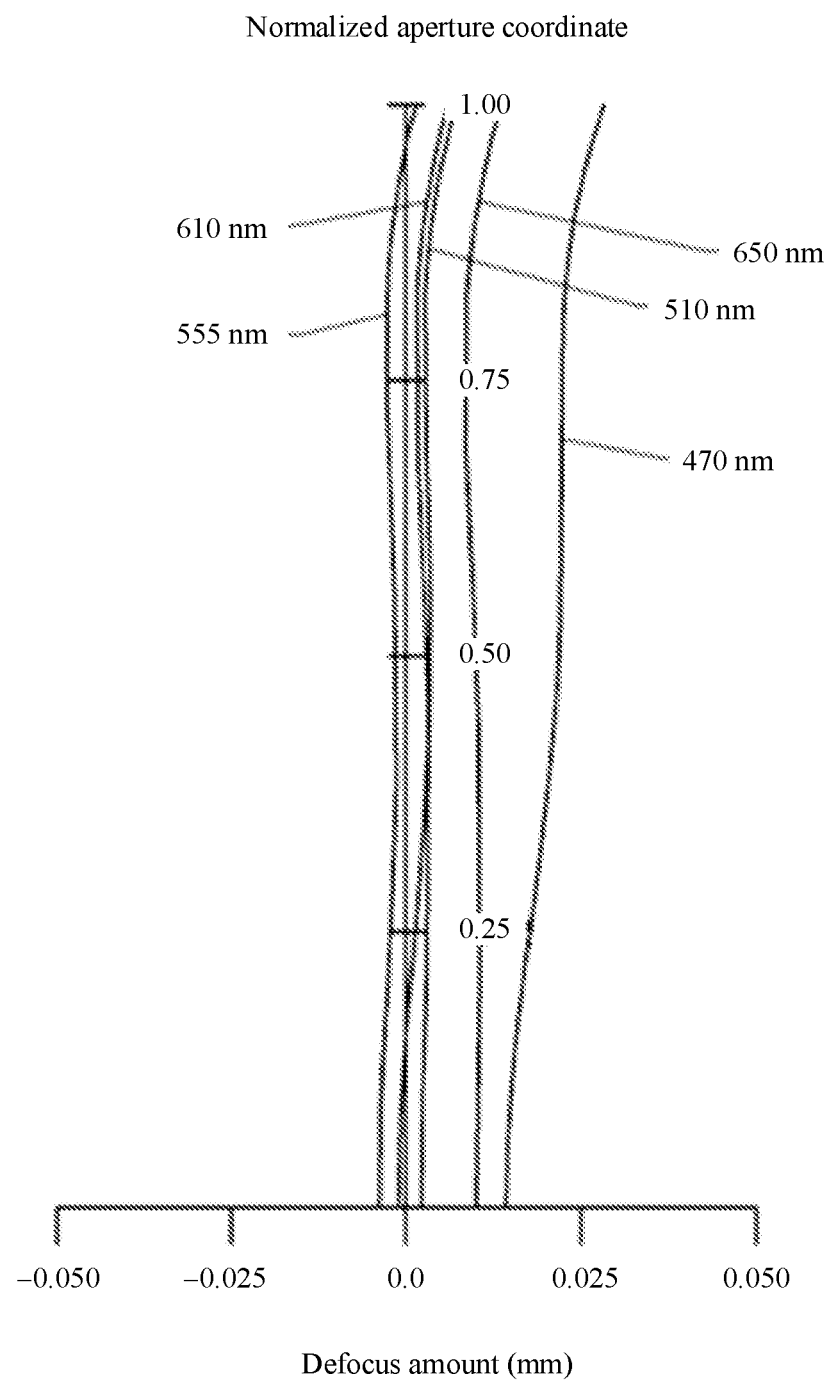
FIG. 21 is an axial spherical aberration curve of the zoom lens shown in FIG. 17 at a second zoom rate.

FIG. 21 is an axial spherical aberration curve of the zoom lens 4 shown in FIG. 17 at a second zoom rate. The five curves represent wavelengths 650 nm, 610 nm, 555 nm, 510 nm, and 470 nm respectively, and the center wavelength is 555 nm. It can be seen from FIG. 21 that, in normalized aperture coordinates, a defocus amount of the center wavelength is less than 10 um, a difference between a defocus amount of any wavelength and the defocus amount of the center wavelength is controlled within a small range.

Figure 22:
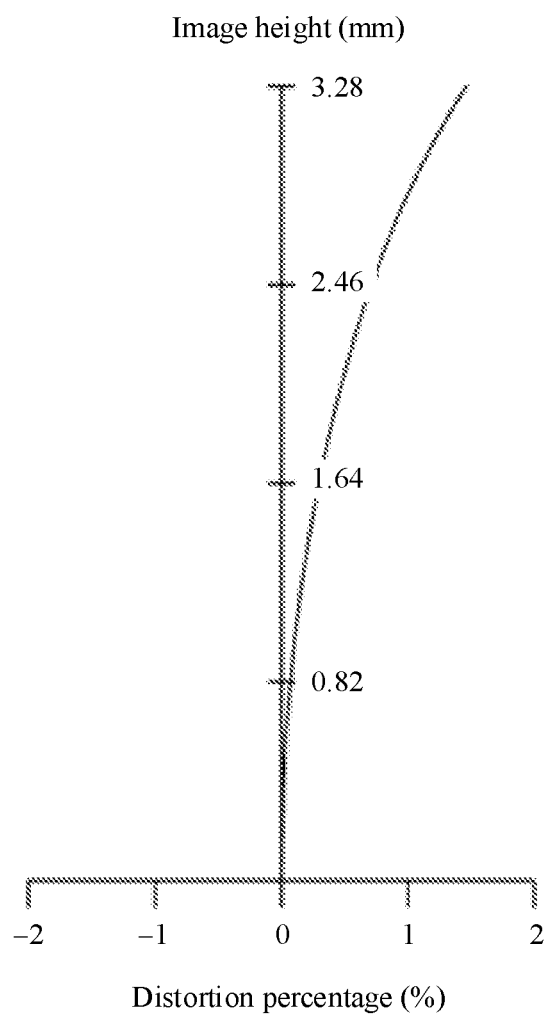
FIG. 22 is a distortion curve of the zoom lens shown in FIG. 17 at the second zoom rate.

FIG. 22 is a distortion curve of the zoom lens 4 shown in FIG. 17 at the second zoom rate. It can be seen from the distortion curve in FIG. 22 that the distortion at a maximum image height is controlled within 2%, which meets the imaging requirement.

Figure 23:
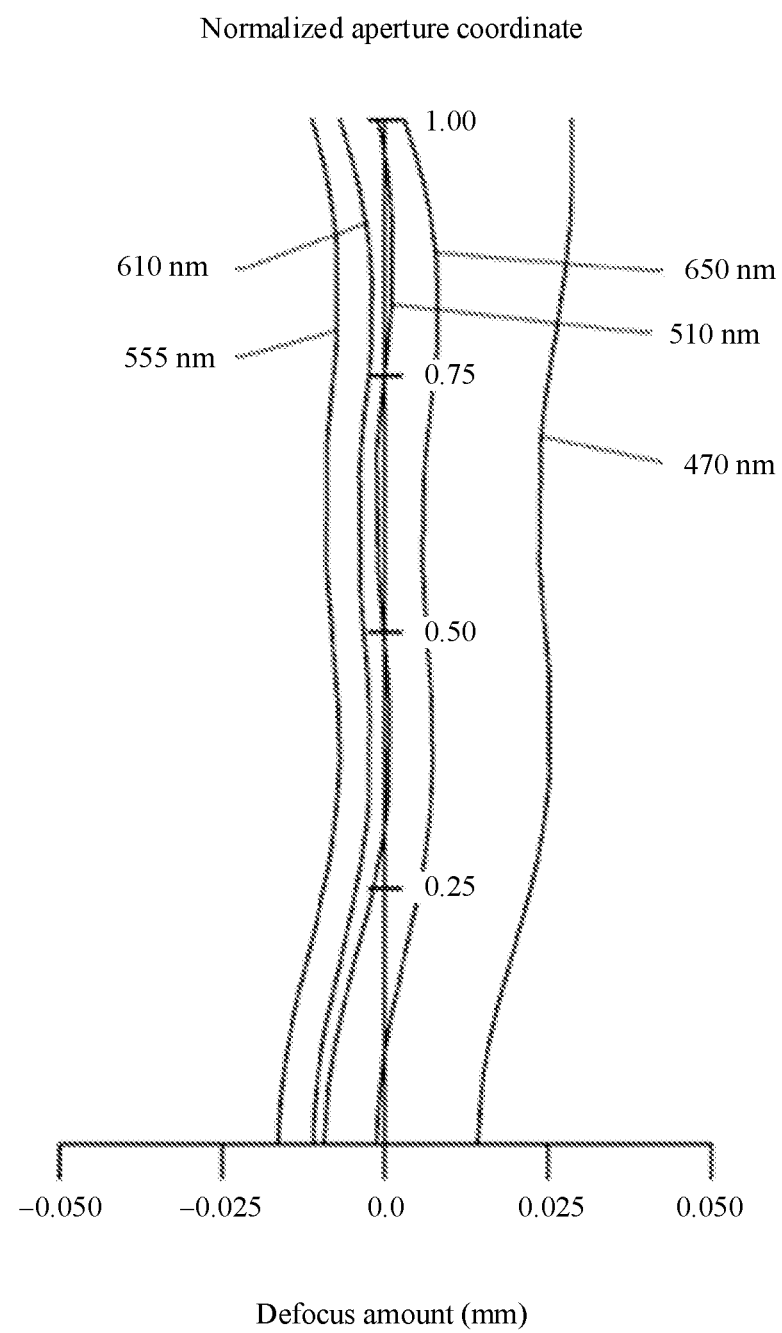
FIG. 23 is an axial spherical aberration curve of the zoom lens shown in FIG. 17 at a third zoom rate.

FIG. 23 is an axial spherical aberration curve of the zoom lens 4 shown in FIG. 17 at a third zoom rate. The five curves represent wavelengths 650 nm, 610 nm, 555 nm, 510 nm, and 470 nm respectively, and the center wavelength is 555 nm. It can be seen from FIG. 23 that, in normalized aperture coordinates, a defocus amount of the center wavelength is less than 10 um, a difference between a defocus amount of any wavelength and the defocus amount of the center wavelength is controlled within a small range.

Figure 24:
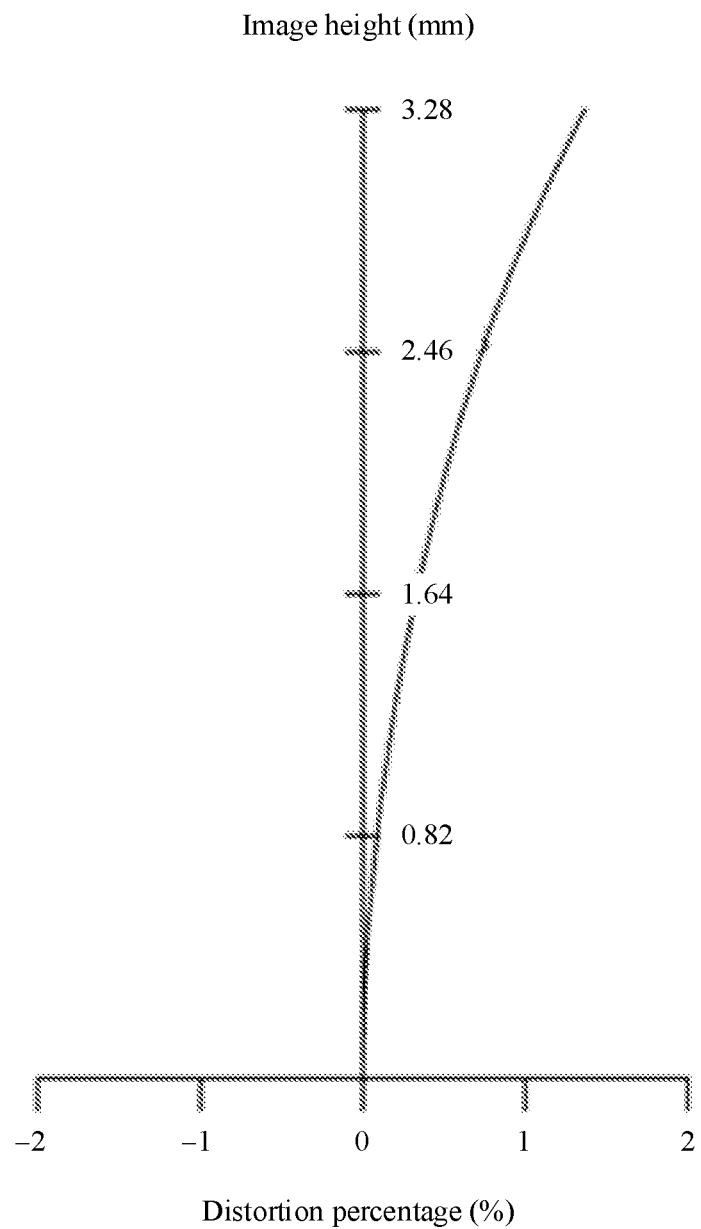
FIG. 24 is a distortion curve of the zoom lens shown in FIG. 17 at the third zoom rate.

FIG. 24 is a distortion curve of the zoom lens 4 shown in FIG. 17 at a third zoom rate. It can be seen from the distortion curve in FIG. 24 that the distortion at a maximum image height is controlled within 2%, which meets the imaging requirement.

Figure 25:
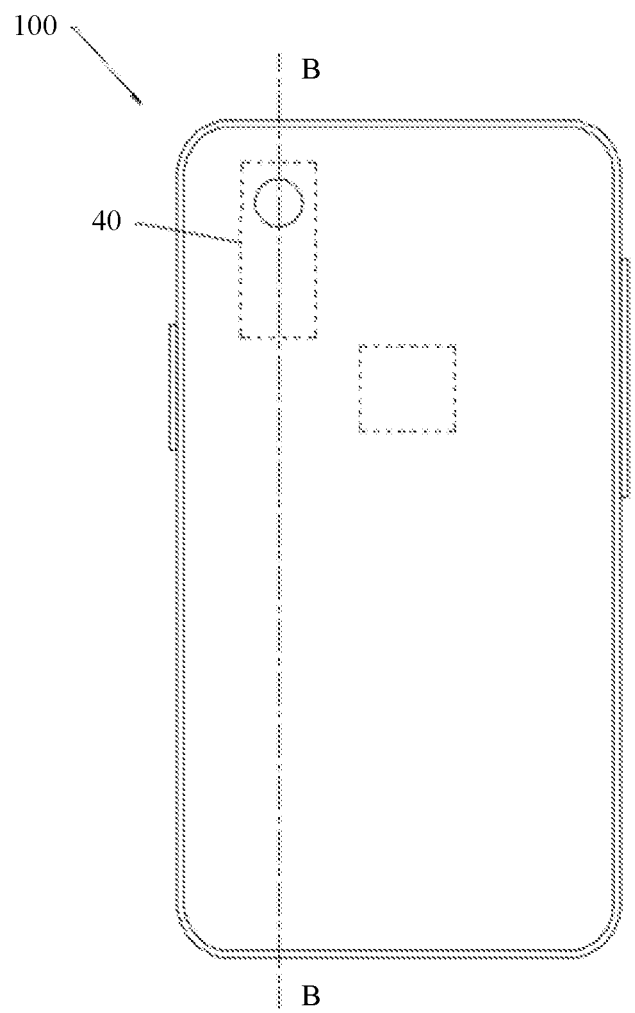
FIG. 25 is a schematic diagram of a structure of a mobile terminal in some embodiments according to an embodiment of this application.
Figure 26:
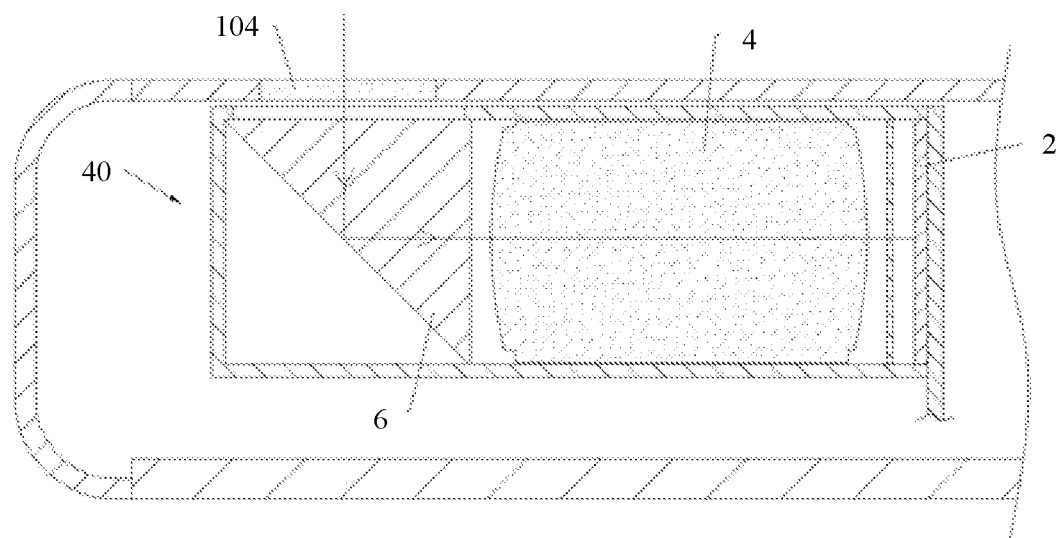
FIG. 26 is a schematic B-B sectional view of the structure of the terminal shown in FIG. 25.

Refer to both FIG. 25 and FIG. 26. FIG. 25 is a schematic diagram of a structure of a mobile terminal 100 according to an embodiment of this application in some other embodiments. FIG. 26 is a schematic B-B sectional view of the structure of the mobile terminal 100 shown in FIG. 25. The mobile terminal 100 in this embodiment includes most features of the mobile terminal 100 in the foregoing embodiment. The following mainly describes main differences between the mobile terminal 100 in this embodiment and the mobile terminal 100 in the foregoing embodiment, and same content is not described again.

The mobile terminal 100 includes a periscope camera module 40. The periscope camera module 40 may include most features of the camera module 40 in the foregoing embodiment, and a main difference lies in that the periscope camera module 40 further includes a reflector 6. The reflector 6 is located on an object side of the zoom lens 4, and is configured to deflect rays to the zoom lens 4. As shown in FIG. 26, after passing through a transparent lens 104 of the mobile terminal 100, rays outside the mobile terminal 100 are reflected to the reflector 6, the reflector 6 deflects the rays to the zoom lens 4, and an image is produced on an image sensor 2 after the rays pass through the zoom lens 4. The camera module 40 collects rays.

In this embodiment, the camera module 40 changes a direction of rays by disposing the reflector 6, so that an optical axis 401 direction of the zoom lens 4 may be different from a direction in which external rays enter the mobile terminal 100. In this way, a placement position, an angle, space, or the like of the camera module 40 is more flexible, and the zoom lens 4 can be used on the periscope camera module 40. For example, the direction of the optical axis of the zoom lens 4 may be parallel to the display screen 20.

Figure 27:
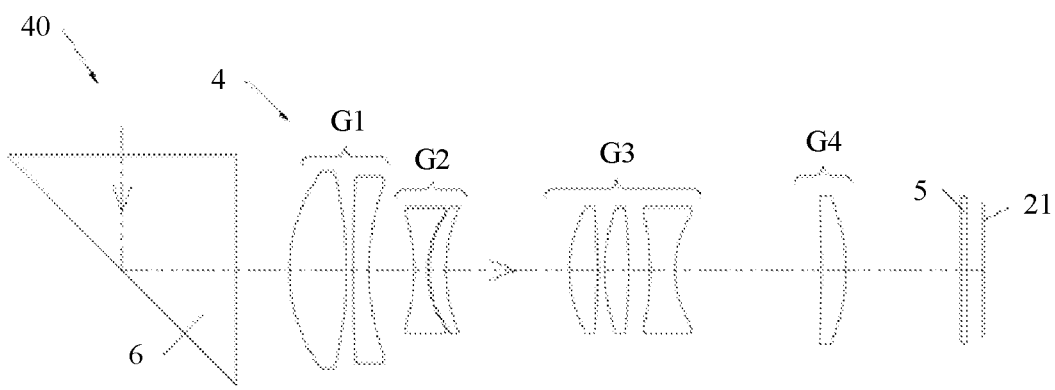
FIG. 27 is a schematic diagram of a partial structure of the camera module shown in FIG. 26 in some embodiments.

FIG. 27 is a schematic diagram of a partial structure of the camera module 40 shown in FIG. 26 in some embodiments.

In some embodiments, the reflector 6 is a prism. The prism deflects rays to the first lens group G1 in the zoom lens 4. After the rays sequentially pass through the first lens group G1, the second lens group G2, the third lens group G3, the fourth lens group G4, and the optical filter 5, an image is produced on the image plane 21 of the image sensor.

For example, the prism includes two straight sides and one hypotenuse side. Light enters the prism through one straight side and emitted out of the prism through the other straight side after being reflected by the hypotenuse side. An included angle of 45° C. may be formed between the hypotenuse side and the optical axis of the zoom lens 4, and the included angle may also be adjusted as required, for example, to be an included angle of 30° C. or 60° C., so that the camera module 40 implements periscope shooting. A structure of the prism, a position of the hypotenuse side, or an angle of the prism are not strictly limited in this application.

Figure 28:
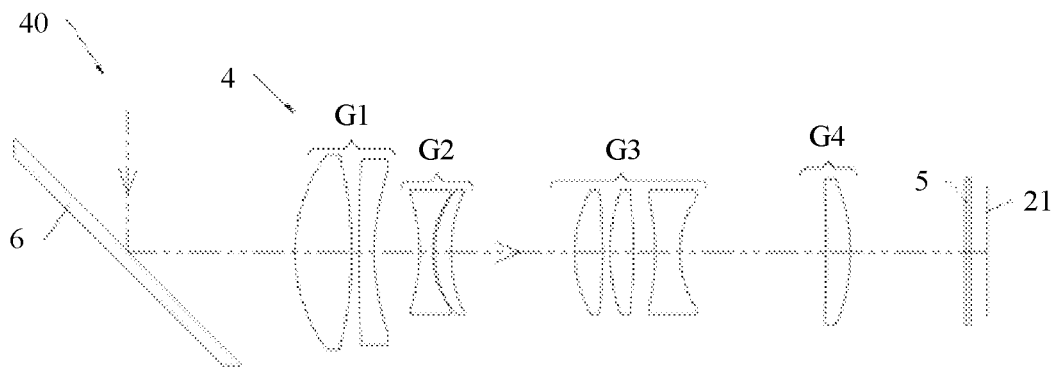
FIG. 28 is a schematic diagram of a partial structure of the camera module shown in FIG. 26 in some other embodiments.

FIG. 28 is a schematic diagram of a partial structure of the camera module 40 shown in FIG. 26 in some other embodiments.

In some embodiments, the reflector 6 is a mirror. The mirror deflects rays to the first lens group G1 in the zoom lens 4. After the rays sequentially pass through the first lens group G1, the second lens group G2, the third lens group G3, the fourth lens group G4, and the optical filter 5, an image is produced on the image plane 21 of the image sensor.

For example, an included angle of 45° C. may be formed between a mirror surface of the mirror and the optical axis of the zoom lens 4, and the included angle may also be adjusted as required, for example, to be an included angle of 30° C. or 60° C., so that the camera module 40 implements periscope shooting. A position, an angle, or the like of the mirror surface of the mirror are not strictly limited in this application.

It can be understood that, in the embodiments shown in FIG. 27 and FIG. 28, an example in which the reflector 6 includes one prism or one mirror is used for description. In some other embodiments, the reflector 6 may alternatively include a plurality of prisms or mirror s, to change a direction of rays for a plurality of times, so that a placement position, an angle, or the like of the zoom lens 4 is more flexible, the camera module 40 can implement periscope shooting while assembly difficulties are relatively low.

The foregoing descriptions are merely specific implementations of this application, but are not intended to limit the protection scope of this application. Any variation or replacement readily figured out by a person skilled in the art within the technical scope disclosed in this application shall fall within the protection scope of this application. If there is no conflict, embodiments of this application and the features in embodiments may be combined with each other. Therefore, the protection scope of this application shall be subject to the protection scope of the claims.

What is claimed is:

1. A A zoom lens, comprising:
    a first lens group, a second lens group, a third lens group, and a fourth lens group that are arranged along an object side to an image side,
    wherein the first lens group is a first fixed lens group with positive focal power,
    wherein the second lens group is a zoom lens group with negative focal power,
    wherein the third lens group is a compensative lens group with positive focal power,
    wherein the fourth lens group is a second fixed lens group with positive focal power,
    wherein, in a zooming process of the zoom lens from a short-focal end to a long-focal end, the second lens group moves towards the image side along an optical axis, and the third lens group moves towards the object side along the optical axis such that movements of the second lens group and the third lens group enable the zoom lens to perform continuous zooming,
    wherein the first lens group comprises at least one lens with positive focal power and at least one lens with negative focal power, and a lens in the first lens group and closest to the object side has positive focal power,
    wherein the second lens group comprises at least two lenses, and a lens in the second lens group and closest to the object side has negative focal power,
    wherein the third lens group comprises at least two lenses, and a lens in the third lens group and closest to the object side has positive focal power, and
    wherein the fourth lens group comprises at least one lens, and a lens in the fourth lens group and closest to the object side has positive focal power.

2. The zoom lens according to claim 1,
    wherein a first ratio of a total track length (TTL) of the zoom lens, from a surface closest to the object side to an image plane, to a first focal length (f1) of the first lens group meets:

$0.7 \leq TTL/f1 \leq 3.2$, wherein a second ratio of the TTL to a second focal length (f2) of the second lens group meets:

$-7 \leq TTL/f2 \leq -3$, wherein a third ratio of the TTL 0 to a third focal length (f3) of the third lens group meets:

$1.7 \leq TTL/f3 \leq 4.5$, and wherein a fourth ratio of the total track length TTL to a fourth focal length (f4) of the fourth lens group meets:

$1 \leq TTL/f4 \leq 2.8$.

3. The zoom lens according to claim 1, wherein a ratio of a stroke (L1) of the second lens group along the optical axis to a TTL of the zoom lens from a surface closest to the object side to an image plane meets:

$|L1/TTL| \leq 0.3$.

4. The zoom lens according to claim 1, wherein a ratio of a stroke (L2) of the third lens group along the optical axis to a TTL of the zoom lens from a surface closest to the object side to an image plane meets:

$|L2/TTL| \leq 0.3$.

5. The zoom lens according to claim 1, wherein a ratio of a TTL of the zoom lens from a surface closest to the object side to an image plane, to a maximum focal length (Fmax) at the long-focal end meets:

$|TTL/Fmax| \leq 2.0$.

6. The zoom lens according to claim 1, wherein a ratio of a maximum focal length (Fmax) at the long-focal end of the zoom lens to a minimum focal length (Fmin) at the short-focal end of the zoom lens meets:

$Fmax/Fmin \leq 5.0$.

7. The zoom lens according to claim 1,
    wherein each lens in the zoom lens is provided with a corresponding notch for reducing a corresponding height of the each lens, or
    wherein a maximum aperture diameter (d) of the each lens in the zoom lens meets: $d \leq 10$ mm.

8. The zoom lens according to claim 1, wherein a maximum aperture diameter (d) of each lens in the zoom lens meets: $d \leq 6.5$ mm.

9. The zoom lens according to claim 1,
    wherein the third lens group comprises an aperture stop, and the third lens group comprises a first lens and a second lens that are arranged along the object side to the image side, and
    wherein the aperture stop is located on a first object side of the first lens in the third lens group, or located between the first lens and the second lens in the third lens group.

10. The zoom lens according to claim 1,
    wherein a working F-number of the zoom lens meets: $2.0 \leq$ working F-number $\leq 6.5$, or
    wherein a total quantity (N) of lenses in the first lens group, the second lens group, the third lens group, and the fourth lens group meets: $6 \leq N \leq 12$, or
    wherein the first lens group, the second lens group, and the third lens group comprise at least one lens made of glass.

11. The zoom lens according to claim 1, wherein a lens in the third lens group and closest to the image side has negative focal power.

12. A camera module, comprising:
    an image sensor and a zoom lens, wherein the zoom lens allows rays to pass through and illuminate the image sensor,
    wherein the zoom lens comprises a first lens group, a second lens group, a third lens group, and a fourth lens group that are arranged along an object side to an image side,
    wherein the first lens group is a first fixed lens group with positive focal power,
    wherein the second lens group is a zoom lens group with negative focal power,
    wherein the third lens group is a compensative lens group with positive focal power, wherein the fourth lens group is a second fixed lens group with positive focal power, wherein, in a zooming process of the zoom lens from a short-focal end to a long-focal end, the second lens group moves towards the image side along an optical axis, and the third lens group moves towards the object side along the optical axis such that movements of the second lens group and the third lens group enable the zoom lens to perform continuous zooming, wherein the first lens group comprises at least one lens with positive focal power and at least one lens with negative focal power, and a lens in the first lens group and closest to the object side has positive focal power, wherein the second lens group comprises at least two lenses, and a lens in the second lens group and closest to the object side has negative focal power, wherein the third lens group comprises at least two lenses, and a lens in the third lens group and closest to the object side has positive focal power, and wherein the fourth lens group comprises at least one lens, and a lens in the fourth lens group and closest to the object side has positive focal power.

13. The camera module according to claim 12, wherein a first ratio of a total track length (TTL) of the zoom lens, from a surface closest to the object side to an image plane, to a first focal length (f1) of the first lens group meets:

$0.7 \leq TTL/f1 \leq 3.2$, wherein a second ratio of the TTL to a second focal length (f2) of the second lens group meets:

$-7 \leq TTL/f2 \leq -3$, wherein a third ratio of the TTL to a third focal length (f3) of the third lens group meets:

$1.7 \leq TTL/f3 \leq 4.5$, and wherein a fourth ratio of the TTL to a fourth focal length (f4) of the fourth lens group meets:

$1 \leq TTL/f4 \leq 2.8$.

14. The camera module according to claim 12, wherein the camera module further comprises a prism or a mirror, and wherein the prism or the mirror is located on the object side of the zoom lens, and is configured to deflect the rays to the zoom lens.

15. A mobile terminal, comprising:

an image processor and a camera module, wherein the image processor and the camera module are in a communication connection, and the image processor is configured to obtain image data from the camera module and process the image data, wherein the camera module comprises an image sensor and a zoom lens, wherein the zoom lens allows rays to pass through and illuminate the image sensor, wherein the zoom lens comprises a first lens group, a second lens group, a third lens group, and a fourth lens group that are arranged along an object side to an image side, wherein the first lens group is a first fixed lens group with positive focal power, wherein the second lens group is a zoom lens group with negative focal power, wherein the third lens group is a compensative lens group with positive focal power, wherein the fourth lens group is a second fixed lens group with positive focal power, wherein, in a zooming process of the zoom lens from a short-focal end to a long-focal end, the second lens group moves towards the image side along an optical axis, and the third lens group moves towards the object side along the optical axis such that movements of the second lens group and the third lens group enable the zoom lens to perform continuous zooming, wherein the first lens group comprises at least one lens with positive focal power and at least one lens with negative focal power, and a lens in the first lens group and closest to the object side has positive focal power, wherein the second lens group comprises at least two lenses, and a lens in the second lens group and closest to the object side has negative focal power, wherein the third lens group comprises at least two lenses, and a lens in the third lens group and closest to the object side has positive focal power, and wherein the fourth lens group comprises at least one lens, and a lens in the fourth lens group and closest to the object side has positive focal power.

16. The mobile terminal according to claim 15, wherein a first ratio of a total track length (TTL) of the zoom lens, from a surface closest to the object side to an image plane, to a first focal length (f1) of the first lens group meets:

$0.7 \leq TTL/f1 \leq 3.2$, wherein a second ratio of the TTL to a second focal length (f2) of the second lens group meets:

$-7 \leq TTL/f2 \leq -3$, wherein a third ratio of the TTL to a third focal length (f3) of the third lens group meets:

$1.7 \leq TTL/f3 \leq 4.5$, and wherein a fourth ratio of the TTL to a fourth focal length (f4) of the fourth lens group meets:

$1 \leq TTL/f4 \leq 2.8$.

17. The mobile terminal according to claim 15, wherein the camera module further comprises a prism or a mirror, and wherein the prism or the mirror is located on the object side of the zoom lens, and is configured to deflect rays to the zoom lens.

18. The zoom lens according to claim 1, wherein a total quantity of lenses in the first lens group, the second lens group, the third lens group, and the fourth lens group is at least 6 and at most 12, wherein the first lens group comprises at most 2 lenses, and a lens in the first lens group and closest to the image side has negative focal power, and wherein a TTL of the zoom lens is at most 45 millimeters (mm).

* * * * *

UNITED STATES PATENT AND TRADEMARK OFFICE
CERTIFICATE OF CORRECTION

| | | |
|---|---|---|
| PATENT NO. | : 12,474,553 B2 | Page 1 of 1 |
| APPLICATION NO. | : 17/908140 | |
| DATED | : November 18, 2025 | |
| INVENTOR(S) | : Niu et al. | |

It is certified that error appears in the above-identified patent and that said Letters Patent is hereby corrected as shown below:

In the Claims

In Column 25, in Claim 1, Line 15, delete "A A" and insert -- A --.

In Column 25, in Claim 2, Line 58, delete "TTL 0" and insert -- TTL --.

Signed and Sealed this
Thirtieth Day of December, 2025

John A. Squires
*Director of the United States Patent and Trademark Office*